United States Patent
Yu et al.

(10) Patent No.: US 10,774,476 B2
(45) Date of Patent: Sep. 15, 2020

(54) ABSORBENT SHEET TAIL-SEALED WITH NANOFIBRILLATED CELLULOSE-CONTAINING TAIL-SEAL ADHESIVES

(71) Applicant: GPCP IP Holdings LLC, Atlanta, GA (US)

(72) Inventors: Zhiying Yu, Oskhosh, WI (US); Siddharth S. Vaijapurkar, Appleton, WI (US); Daniel W. Sumnicht, Hobart, WI (US)

(73) Assignee: GPCP IP Holdings LLC, Atlanta, GA (US)

(*) Notice: Subject to any disclaimer, the term of this patent is extended or adjusted under 35 U.S.C. 154(b) by 594 days.

(21) Appl. No.: 15/405,795

(22) Filed: Jan. 13, 2017

(65) Prior Publication Data

US 2017/0204304 A1    Jul. 20, 2017

Related U.S. Application Data

(60) Provisional application No. 62/366,154, filed on Jul. 25, 2016, provisional application No. 62/366,137, (Continued)

(51) Int. Cl.
*D21H 27/32* (2006.01)
*C09J 5/04* (2006.01)
(Continued)

(52) U.S. Cl.
CPC .............. *D21H 27/002* (2013.01); *C08L 1/02* (2013.01); *C08L 1/08* (2013.01); *C08L 5/00* (2013.01);
(Continued)

(58) Field of Classification Search
None
See application file for complete search history.

(56) References Cited

U.S. PATENT DOCUMENTS 3,414,459 A    12/1968    Wells
3,994,771 A    11/1976    Morgan, Jr. et al.
(Continued)

FOREIGN PATENT DOCUMENTS

CN    102863940 B    2/2015
EP    0947549 A1    10/1999
(Continued)

OTHER PUBLICATIONS

International Preliminary Report on Patentability (U.S. Appl. No. 15/405,397; our Reference 30491) dated Jan. 29, 2018.
(Continued)

*Primary Examiner* — Frank D Ducheneaux
(74) *Attorney, Agent, or Firm* — Laura L. Bozek

(57) ABSTRACT

A roll of absorbent sheet tail-sealed with an NFC containing aqueous tail-seal adhesive includes an NFC containing aqueous tail-seal adhesive interposed between a tail of the roll of absorbent sheet and an underlying convolution of the roll adhering the tail to the underlying convolution to form the tail-seal. The NFC containing tail-seal adhesive comprises nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier. The NFC containing tail-seal adhesive optionally includes a surface tension modifier other than PVOH.

25 Claims, 19 Drawing Sheets

Related U.S. Application Data filed on Jul. 25, 2016, provisional application No. 62/280,161, filed on Jan. 19, 2016.

(51) Int. Cl.

| | | |
|---|---|---|
| C09J 7/21 | (2018.01) | |
| C09J 11/08 | (2006.01) | |
| C09J 101/04 | (2006.01) | |
| C09J 129/04 | (2006.01) | |
| C09J 105/00 | (2006.01) | |
| C09J 105/06 | (2006.01) | |
| C09J 171/02 | (2006.01) | |
| C08L 1/02 | (2006.01) | |
| C08L 1/08 | (2006.01) | |
| C08L 5/06 | (2006.01) | |
| C08L 71/02 | (2006.01) | |
| D21H 27/00 | (2006.01) | |
| D21H 21/24 | (2006.01) | |
| C08L 5/00 | (2006.01) | |

(52) U.S. Cl.
CPC ............... *C08L 5/06* (2013.01); *C08L 71/02* (2013.01); *C09J 5/04* (2013.01); *C09J 7/21* (2018.01); *C09J 11/08* (2013.01); *C09J 101/04* (2013.01); *C09J 105/00* (2013.01); *C09J 105/06* (2013.01); *C09J 129/04* (2013.01); *C09J 171/02* (2013.01); *D21H 21/24* (2013.01); *D21H 27/005* (2013.01); *D21H 27/32* (2013.01); *C08L 2205/025* (2013.01); *C08L 2205/03* (2013.01); *C09J 2401/00* (2013.01); *C09J 2401/006* (2013.01); *C09J 2405/00* (2013.01); *C09J 2429/00* (2013.01)

(56) References Cited

U.S. PATENT DOCUMENTS

| | | |
|---|---|---|
| 4,026,752 A | 5/1977 | Hartbauer et al. |
| 4,102,737 A | 7/1978 | Morton |
| 4,351,699 A | 9/1982 | Osborn, III |
| 4,441,962 A | 4/1984 | Osborn, III |
| 4,447,294 A | 5/1984 | Osborn, III |
| 4,460,738 A | 7/1984 | Frentzel et al. |
| 4,528,334 A | 7/1985 | Knopf et al. |
| 4,529,480 A | 7/1985 | Trokhan |
| 4,702,496 A | 10/1987 | Hume, III |
| 5,240,562 A | 8/1993 | Phan et al. |
| 5,279,767 A | 1/1994 | Phan et al. |
| 5,622,597 A | 4/1997 | Callen et al. |
| 5,698,076 A | 12/1997 | Phan et al. |
| 5,730,839 A | 3/1998 | Wendt et al. |
| 5,753,079 A | 5/1998 | Jenny et al. |
| 5,858,554 A | 1/1999 | Neal et al. |
| 6,342,297 B1 | 1/2002 | LaBrash |
| 6,734,335 B1 | 5/2004 | Graef et al. |
| 7,201,815 B2 | 4/2007 | Muvundamina |
| 7,585,388 B2 | 9/2009 | Yeh et al. |
| 7,585,389 B2 | 9/2009 | Yeh et al. |
| 7,614,110 B2 | 11/2009 | Akai et al. |
| 7,642,226 B2 | 1/2010 | Verrall et al. |
| 7,662,257 B2 | 2/2010 | Edwards et al. |
| 7,700,764 B2 | 4/2010 | Heijnesson-Hultén |
| 7,736,464 B2 | 6/2010 | Kokko |
| 7,799,402 B2 | 9/2010 | Redmann et al. |
| 7,850,823 B2 | 12/2010 | Chou et al. |
| 7,951,266 B2 | 5/2011 | Kokko et al. |
| 7,967,933 B2 | 6/2011 | Redmann et al. |
| 8,057,892 B2 | 11/2011 | Yang et al. |
| 8,287,692 B2 | 10/2012 | Miyawaki et al. |
| 8,287,986 B2 | 10/2012 | Huss et al. |
| 8,377,563 B2 | 2/2013 | Miyawaki et al. |
| 8,409,404 B2 | 4/2013 | Harper et al. |
| 8,546,558 B2 | 10/2013 | Ankerfors et al. |
| 8,647,468 B2 | 2/2014 | Heiskanen et al. |
| 8,728,273 B2 | 5/2014 | Heiskanen et al. |
| 8,747,612 B2 | 6/2014 | Heiskanen et al. |
| 8,778,134 B2 | 7/2014 | Vehvilainen et al. |
| 8,778,138 B2 | 7/2014 | Super et al. |
| 8,992,728 B2 | 3/2015 | Isogai et al. |
| 9,000,073 B2 | 4/2015 | Ceulemans et al. |
| 9,822,285 B2 | 11/2017 | Sumnicht et al. |
| 2008/0142177 A1 | 6/2008 | Shannon et al. |
| 2009/0042003 A1 | 2/2009 | Govang et al. |
| 2009/0308552 A1 | 12/2009 | Yano et al. |
| 2010/0285295 A1 | 11/2010 | Wang et al. |
| 2010/0300605 A1 | 12/2010 | Redmann et al. |
| 2011/0052881 A1 | 3/2011 | Netravali et al. |
| 2011/0263756 A1 | 10/2011 | Yano et al. |
| 2011/0277947 A1 | 11/2011 | Hua et al. |
| 2012/0058536 A1 | 3/2012 | Ruda et al. |
| 2012/0219816 A1 | 8/2012 | Heiskanen et al. |
| 2014/0083634 A1 | 3/2014 | Bjoerkqvist et al. |
| 2014/0154756 A1 | 6/2014 | Nelson et al. |
| 2014/0284407 A1 | 9/2014 | Tamper et al. |
| 2015/0090156 A1 | 4/2015 | Combs et al. |
| 2015/0167243 A1 | 6/2015 | Bilodeau et al. |
| 2015/0368368 A1 | 12/2015 | Retsina et al. |
| 2016/0215179 A1 | 7/2016 | Sumnicht et al. |
| 2017/0204304 A1 | 7/2017 | Yu et al. |
| 2017/0204567 A1 | 7/2017 | Yu et al. |
| 2018/0037781 A1 | 2/2018 | Sumnicht et al. |

FOREIGN PATENT DOCUMENTS

| | | |
|---|---|---|
| EP | 2526158 A1 | 11/2012 |
| JP | S60250079 A | 12/1985 |
| JP | 2012197544 A | 10/2012 |
| JP | 2015189205 A | 11/2015 |
| WO | 1997008387 A1 | 3/1997 |
| WO | 1997011226 A1 | 3/1997 |
| WO | 2006071147 A1 | 7/2006 |
| WO | 2010066905 A1 | 6/2010 |
| WO | 2011089053 A1 | 7/2011 |
| WO | 2014085729 A1 | 6/2014 |
| WO | 2016122956 A1 | 8/2016 |
| WO | 2017127335 A1 | 7/2017 |
| WO | 2017127336 A1 | 7/2017 |

OTHER PUBLICATIONS

International Preliminary Report on Patentability (U.S. Appl. No. 15/405,795) dated Jan. 28, 2018.
International Search Report dated Mar. 30, 2017.
Written Opinion dated Mar. 30, 2017.
International Search Report dated Mar. 30, 2017 (PCT/US2017/013691; Corresponding to U.S. Appl. No. 15/405,397).
Written Opinion dated Mar. 30, 2017 (PCT/US2017/013691; Corresponding to U.S. Appl. No. 15/405,397).
International Search Report dated Feb. 26, 2016 (PCT/US2016/014256; Corresponding to U.S. Appl. No. 15/000,071).
Written Opinion dated Feb. 26, 2016 (PCT/US2016/014256; Corresponding to U.S. Appl. No. 15/000,071).
Written Opinion dated Nov. 14, 2016 (PCT/US2016/014256; Corresponding to U.S. Appl. No. 15/000,071).
Garcia-Ochoa F., et al., "Xanthan gum: production, recovery, and properties", Biotechnology Advances, 2000, 549-579, vol. 18, Elsevier Science Inc.
International Preliminary Report on Patentability dated May 10, 2017 (PCT/US2016/014256; Corresponding to U.S. Appl. No. 15/000,071).
Extended European Search report dated Oct. 15, 2018 in related European patent application No. EP 16743873.
Bertolla, L. et al.; "Preparation and characterization of Bioglass-based scaffolds reinforced by poly-vinyl alcohol/microfibrillated cellulose composite coating"; Journal of the European Ceramic Society; 2014; pp. 3379-3387; 34; Elsevier Ltd.

(56) References Cited

OTHER PUBLICATIONS

Bertolla, L. et al.; "Preparation and characterization of Bioglass-based scaffolds reinforced by poly-vinyl alcohol/microfibrillated cellulose composite coating"; Chem Abstracts Service: XP002782684; pp. 1-2.
S. Jonjankiat et al., "Improvement of Poly(Vinyl Alcohol) Adhesives With Cellulose Microfibre from Surgarcane Bagasse", Iranian Polymer Journal, Jan. 1, 2011, pp. 305-317, vol. 20, No. 4, Iran Polymer and Petrochemical Institute, IR.
Partial European Search report in related European counterpart application to U.S. Appl. No. 15/951,630 dated Aug. 3, 2018.
Lu, J., et al., "Preparation and properties of microfibrillated cellulose polyvinyl alcohol composite materials", Composites: Part A (2008), pp. 738-746, vol. 39, Elsevier.
Richter, K., et al., "Performance of cellulose nano-fibrils in wood adhesives", Proceeding of Swiss Bonding 09 (2009), pp. 239-246.
Virtanen, S., et al., "Modified nanofibrillated cellulose-polyvinyl alcohol films with improved mechanical performance", RSC Advances (2014), vol. 4, pp. 11343-11350, The Royal Society of Chemistry.
Adel et al., "A study of wet and dry strength properties of unaged and hygrothermally aged paper sheets reinforced with biopolymer composites", Journal of Applied Polymer Science, 2014, pp. 40761-40774, 131(18), Wiley.
Gonzalez et al., "From paper to nanopaper: evolution of mechanical and physical properties", presentation at Seminar: "Ongoing modification of cellulose nanofibers and their potential applications", Oct. 15-16, 2015, pp. 1-31, Madrid, Spain; related to Gonzalez et al., "From paper to nanopaper: evolution of mechanical and physical properties", Cellulose, 2014, pp. 2599-2609, vol. 21, Issue 4, Springer Netherlands.
Huang et al., "Adhesive properties of soy proteins modified by sodium dodecyl sulfate and sodium dodecylbenzene sulfonate", Journal of the American Oil Chemists' Society, 2000, pp. 705-708, vol. 77, Issue 7, AOCS Press.
Paako et al., "Enzymatic Hydrolysis Combined with Mechanical Shearing and High-Pressure Homogenization for Nanoscale Cellulose Fibrils and Strong Gels", Biomacromolecules, 2007, pp. 1934-1941, 8 (6), American Chemical Society.
Vishnuvarthanan et al., "Additives for enhancing the drying properties of adhesives for corrugated boards", Alexandria Engineering Journal, 2013, pp. 137-140, vol. 52, Issue 1, Elsevier B.V.
European Search Report dated Jul. 4, 2019.
Sorvari, Anni et al., "Modifying the flocculation of microfibrillated cellulose suspensions by soluble polysaccharides under conditions unfavorable to adsorption"; Carbohydrate Polymers, Jun. 15, 2014, pp. 283-292, vol. 106, Elsevier Ltd.
European Search Report dated Jul. 4, 2019 in related U.S. Appl. No. 15/405,397, filed Jan. 13, 2017.

SEM MICROGRAPHS OF NFC PREPARED BY AIR DRYING (A) AND SUPERCRITICAL $CO_2$ DRYING (B)

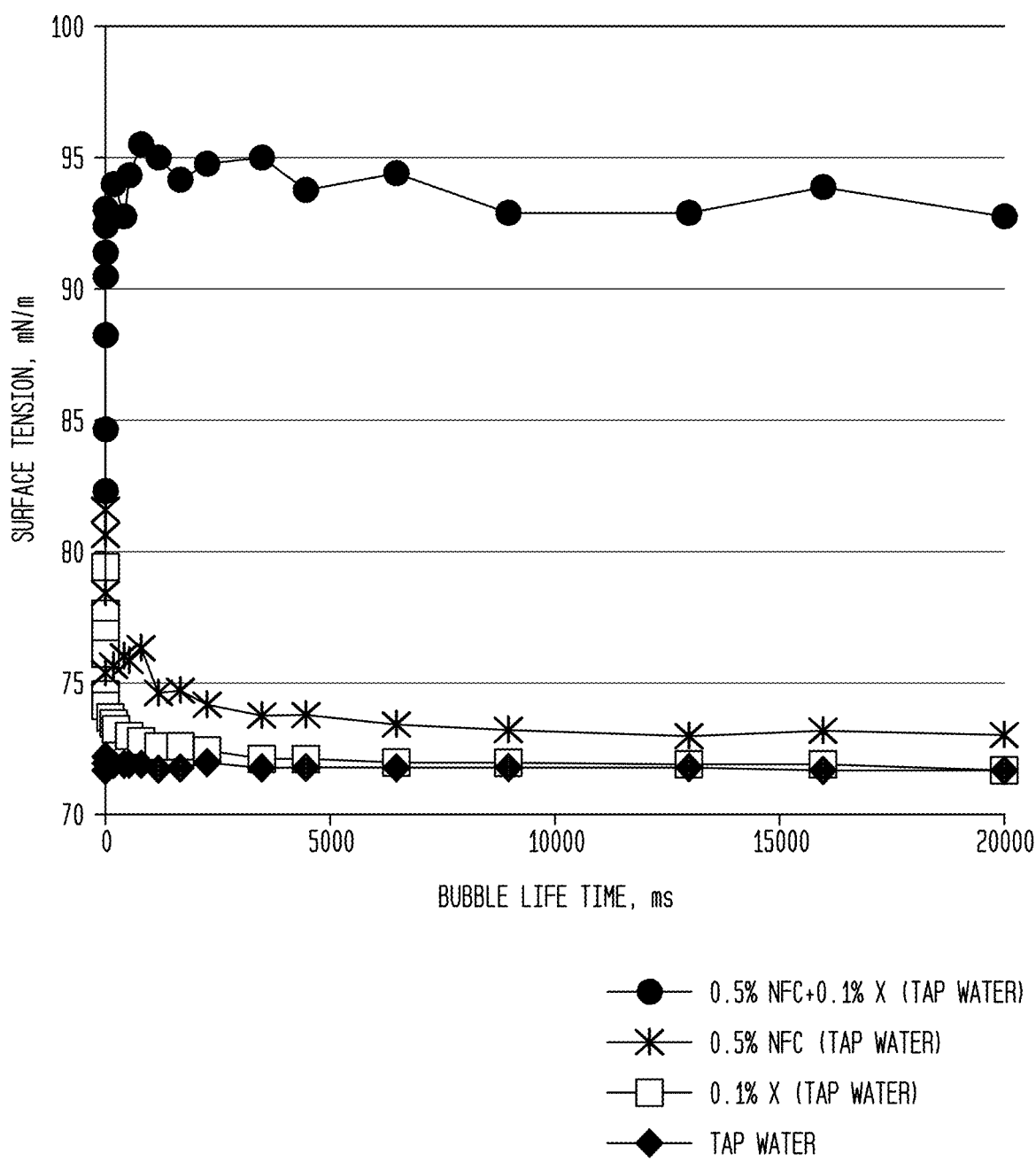

NFC W/ VISCOSITY MODIFIER

NFC-CMC BONDING AGENT

NFC-PECTIN BONDING AGENT

ABSORBENT SHEET TAIL-SEALED WITH NANOFIBRILLATED CELLULOSE-CONTAINING TAIL-SEAL ADHESIVES

CLAIM FOR PRIORITY

This application is based on U.S. Provisional Application No. 62/280,161, filed Jan. 19, 2016, entitled Nanofibrillated Cellulose Ply-bonding Agent and Multi-Ply Absorbent Sheet Made Therewith and U.S. Provisional Application No. 62/366,154, filed Jul. 25, 2016 entitled Converting Process and Multi-Ply Absorbent Sheet with Nanofibrillated Cellulose Ply-Bonding Adhesive as well as U.S. Provisional Application No. 62/366,137 filed Jul. 25, 2016 entitled Absorbent Sheet Tail Sealed with Nanofibrillated Cellulose Containing Adhesives. The priorities of the foregoing applications are hereby claimed and their disclosures incorporated herein by reference.

TECHNICAL FIELD

The present invention is directed to absorbent paper sheet such as paper tissue or paper towel in roll form wherein the tail is bonded to an underlying convolution of a roll with a bonding composition containing nanofibrillated cellulose. Preferred adhesives include nanofibrillated cellulose, a water soluble cellulose derivative and polyethylene glycol.

BACKGROUND

Absorbent sheet including bath tissue and paper towel is delivered in roll form. Bath tissue and paper towels are commonly sold as rolls of multi-ply tissue shrink-wrapped in polyethylene. Typically, when the parent roll of tissue is converted to a "log", the outermost layer in these rolls is lightly adhered to the underlying layer or layers to form a tail-seal. Tail sealing is intended to not only prevent the loose end of the roll from unraveling and interfering with the manufacturing process but also to insure that the package is attractive while facilitating handling of loose rolls by the consumer. However, imperfect tail-sealing often leads to numerous consumer complaints when it interferes with easy removal of the sheet from the roll. In general, complaints referring to improper tail-sealing are among the most common complaints for many absorbent sheet products. In the case of multi-ply products, complaints about ply separation are especially common.

Hot melt adhesives are conventionally used for tail-sealing absorbent sheet as is seen in U.S. Pat. No. 7,799,402 to Redmann et al. and U.S. Pat. No. 4,026,752 to Hartbauer et al. So also, low solids aqueous compositions are sometimes conventionally employed. See U.S. Pat. No. 7,967,933 to Redmann et al. See, also, U.S. Pat. No. 6,342,297 to LaBrash where polyethylene glycol (PEG)/cellulosic tail-seal adhesives are described.

Adhesives for use with absorbent sheet generally are seen in United States Patent Application Publication No. US2015/0090156 of Combs et al., entitled Adhesives That Include Plasticized Starch Derivatives and Methods and Articles Relating Thereto (Celanese Acetate LLC). This reference discloses hot melt adhesive compositions based on starch, cellulose acetate and/or acetins and proposes the use of cellulose nanofibrils as an optional filler and xanthan gum an optional polymeric ingredient. See, also, U.S. Pat. No. 5,858,554 to Neal et al., entitled Paper Product Comprising Adhesively Joined Plies which describes absorbent sheet provided with polyvinyl alcohol or starch adhesive compositions; note Col. 4, lines 20-55.

Nanofibrillated cellulose (NFC) or sometimes referred to as microfibrillated cellulose (MFC) is known in the art to be useful for a variety of purposes, including for use as a structural material in sheet and related articles. For example, in U.S. Pat. No. 6,734,335 it is mentioned that NFC is useful in absorbent structures. Col. 22, lines 13+. See, also, U.S. Pat. No. 7,614,110, Col. 13, lines 38+. United States Patent Application Publication No. US 2012/0219816 discloses use of NFC as a layer in a multilayer paperboard structure, Abstract. See, generally, United States Patent Application Publication No. US 2012/0058536, ¶[0151], which discloses NFC as a structural material. NFC is used in molded structures, as seen in United States Patent Application Publication No. US 2009/0308552, ¶[0001], as well as United States Patent Application Publication No. US 2011/0263756, Abstract. NFC is, likewise, known for use in adhesives. JP 60250079 discloses a liquid adhesive made by blending a polyvinyl acetate emulsion, sodium carboxymethylcellulose and above 3-4% NFC based on the weight of the liquid composition. See, also, United States Patent Application Publication No. US 2010/0285295, ¶[0023], where NFC is mentioned as a filler for an adhesive resin; United States Patent Application Publication No. US 2011/0052881, ¶[0062], having similar discussion, as well as United States Patent Application Publication No. US 2009/0042003, ¶[0057].

Despite the availability of numerous adhesive materials and methods of tail-sealing, effective tail-sealing of rolled goods remains a significant problem in terms of manufacturing and customer satisfaction.

SUMMARY OF INVENTION

Aqueous compositions including nanofibrillated cellulose together with additional components have been found to be surprisingly effective for tail-sealing rolls of absorbent sheet. NFC greatly enhances Tail-Seal Bond Strength when used with other components as compared to conventional adhesives. This allows one to tailor the tail-seal adhesive to provide optimal levels of Tail-Seal Bond Strength for a given rolled product and converting line. The inventive NFC containing tail-seal adhesive comprises nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier. Optionally included is a surface tension modifier other than PVOH.

Without intending to be bound by any theory, it is believed that NFC bonds the tail of a roll of absorbent sheet to an underlying convolution by way of a "double ended nail" mechanism. This may be similar to the mechanism employed by Velcro® strips for temporarily plying two surfaces together. The forces involved in holding adhesives to their substrates are mainly from adhesive and cohesive forces. Adhesive forces hold two materials together at their surface, and cohesive forces are those forces that exist between molecules of the same materials. For NFC containing tail-seal adhesives, both the NFC and the substrate are made from cellulose, the adhesive and cohesive forces are consistent and they are both hydrogen bonds. Hydrogen bonds are stronger bonds than Van der Waals forces which may be the force between cellulose and conventional adhesives.

The superior water retention ability of the NFC containing tail-seal adhesives may reduce undue penetration of the adhesive so that the tail is readily separated in subsequent use without causing ply separation or otherwise damaging the roll. The tail-seal adhesives of the invention are thus particularly useful for multi-ply products where excessive tail seal strength can cause ply separation when the product is used.

The surprising increases in Tail-Seal Bond Strength also enables a manufacturer to use less adhesive for a given product, lowering converting costs while improving product quality.

Still further features and advantages of the invention will become apparent from the discussion which follows.

BRIEF DESCRIPTION OF DRAWINGS

The invention is described in detail below with reference to the drawings wherein like numerals designate similar parts and wherein:

FIG. 14A is a plot showing the surface tension of NFC, tap water and xanthan gum;

DETAILED DESCRIPTION

Figure 1:
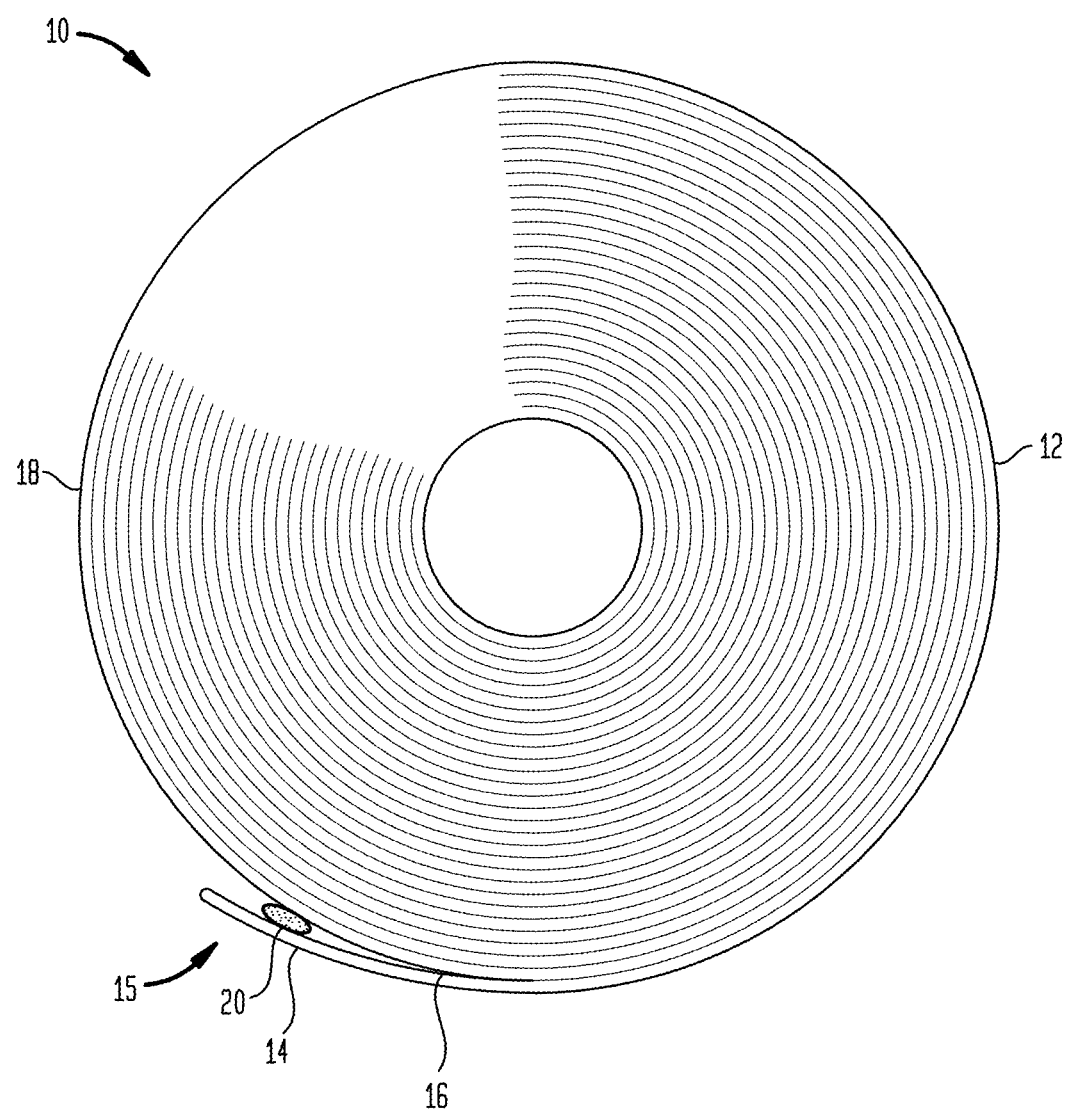
FIG. 1 is a schematic sectional view illustrating flat tail-sealing of a tissue roll, including pressing the end portion of a tissue roll against an underlying convolution of the roll with the inventive adhesive therebetween.

The invention is described in detail below in connection with the Figures for purposes of illustration, only. The invention is defined in the appended claims. Terminology used herein is given its ordinary meaning consistent with the exemplary definitions set forth immediately below; mg refers to milligrams and $m^2$ refers to square meters, Fpm refers to feet per minute and so forth.

Adhesive Viscosity is measured at room temperature using a cone and plate geometry.

Characteristic Breaking Length of NFC material is determined by testing a handsheet of the subject NFC fiber as described herein.

Characteristic Nanofiber Viscosity is measured on a 1 wt % suspension of the NFC in water as further described herein.

"Consisting essentially of" and like terminology refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components.

A surface tension modifier refers to an agent effective to reduce the surface tension of an aqueous composition of the invention. The addition of surface tension modifier is optional depending on the needs of the application. Typically, a suitable surface tension modifier is used in amounts effective to reduce the surface tension of the same composition without a surface tension modifier by at least about 10 mN/m, preferably by 15 mN/m, 20 mN/m or more. The same composition without a surface tension modifier refers to a composition with the same ingredients and proportions except that the surface tension modifier is absent.

A viscosity modifier refers to an agent effective to reduce the viscosity of an aqueous composition including NFC. Preferred viscosity modifiers are effective to reduce the room temperature viscosity of a 1% NFC aqueous composition by at least 750 cP at a shear rate of $100\ s^{-1}$ when added to the composition at a level of 0.1% by weight of the aqueous composition.

Cellulosic Sheet, Papermaking Components and Related Terminology

The term "cellulosic", "cellulosic sheet" and the like are meant to include any product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as eucalyptus, maple, birch, aspen, or the like. Papermaking fibers used in connection with the invention are typically naturally occurring pulp-derived fibers (as opposed to reconstituted fibers such as lyocell or rayon) which are liberated from their source material by any one of a number of pulping processes familiar to one experienced in the art including sulfate, sulfite, polysulfide, soda pulping, etc. The pulp can be bleached if desired by chemical means including the use of chlorine dioxide, oxygen, alkaline peroxide and so forth. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including papermaking fibers, optionally wet strength resins, debonders and the like for making absorbent paper basesheets.

Debonder compositions include surfactants and are widely used in the paper industry. There is disclosed in U.S. Pat. No. 7,736,464 to Kokko a debonder composition including a combination of: (a) a quaternary ammonium surfactant component; and (b) a nonionic surfactant component. In many cases, these compositions include a quaternary ammonium surfactant component comprising a surfactant compound selected from the group consisting of a dialkyldimethyl-ammonium salt of the formula:

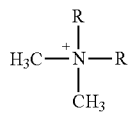

a bis-dialkylamidoammonium salt of the formula:

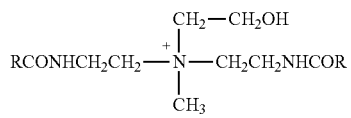

a dialkylmethylimidazolinium salt of the formula:

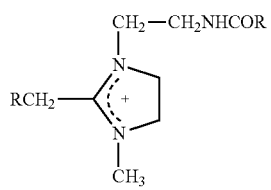

wherein each R may be the same or different and each R indicates a hydrocarbon chain having a chain length of from about twelve to about twenty-two carbon atoms and may be saturated or unsaturated; and wherein said compounds are associated with a suitable anion; and (b) a nonionic surfactant component that preferably includes a surfactant selected from the group consisting of alkoxylated fatty acids and alkoxylated fatty alcohols. Typically the nonionic surfactant includes the reaction product of a fatty acid or fatty alcohol with ethylene oxide such as a polyethylene glycol diester of a fatty acid (PEG diols or PEG diesters). One preferred composition which is used in connection with the present invention includes 30 wt % of imidazolinium (Im+) quats in a 1:1 mixture of PEG-400-mono and dioleates.

The quaternary ammonium surfactant component most preferably includes an imidazolinium salt. Other debonder compositions are disclosed in the following references: U.S. Pat. No. 5,622,597 to Callen et al.; U.S. Pat. No. 4,441,962 to Osborn, III and U.S. Pat. No. 4,351,699 also to Osborn, III; U.S. Pat. No. 5,698,076 to Phan et al.; U.S. Pat. No. 5,730,839 to Wendt et al.; U.S. Pat. No. 5,753,079 to Jenny et al.; U.S. Pat. No. 4,447,294 to Osborn, III; U.S. Pat. No. 5,279,767 to Phan et al. and U.S. Pat. No. 5,240,562 of Phan et al. Debonder applied to the absorbent sheet is expressed on a dry basis of pounds debonder/ton of papermaking fiber in the absorbent sheet.

In 2 or 3 ply products tail-sealed in accordance with the invention, at least one of a first absorbent cellulosic basesheet or a second cellulosic basesheet may be treated with debonder composition in an amount of from 1 lb of debonder composition per ton of cellulosic papermaking fiber used to make the basesheet to 16 lbs of debonder composition per ton of papermaking fiber used to make the basesheet. More typically, at least one of the first absorbent cellulosic basesheet or the second cellulosic basesheet are treated with debonder composition in an amount of from 2 lbs of debonder composition per ton of cellulosic papermaking fiber used to make the basesheet to 10 lbs of debonder composition per ton of papermaking fiber used to make the basesheet. Intermediate amounts may also be used.

Debonder may be applied to the sheet by any suitable method such as spraying or more typically by way of adding the debonder to the aqueous furnish in the headbox of a papermaking machine used to produce the sheet. In cases where a multilayer headbox is used to produce plies having multiple layers, treatment levels of debonder apply to any layer provided to the sheet. For example, if one layer has no added debonder (other than perhaps residual debonder in the water provided to the furnish) and another layer is treated at 4 lbs debonder/ton of papermaking fiber in the sheet, then the basesheet is considered to be treated at a level of 4 lbs debonder/ton.

Kraft softwood fiber is low yield fiber made by the well-known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., eucalyptus and also has generally a lignin content of less than 5 percent by weight. Kraft hardwood fibers are shorter than softwood fibers, typically having a length weighted average fiber length of less than 1 mm and an arithmetic average length of less than 0.5 mm or less than 0.4 mm.

Recycle fiber may be added to the papermaking furnish in any amount. While any suitable recycle fiber may be used, recycle fiber with relatively low levels of ground wood is preferred in many cases, for example recycle fiber with less than 15% by weight lignin content, or less than 10% by weight lignin content may be preferred depending on the furnish mixture employed and the application. Recycle fiber is in many cases 80% hardwood fiber.

"Basesheet" refers to a unitary cellulosic sheet as manufactured by a paper machine. Basesheets may be layered; however, they have a unitary structure not readily delaminated. A "ply" of a finished product refers to basesheet incorporated into a multi-ply product.

Unless otherwise specified, "basis weight", BWT, bwt, and so forth refers to the weight of a 3000 ft$^2$ ream of product. Consistency refers to percent solids of a nascent web, for example, calculated on a bone dry basis. "Air dry" or simply "dry" means including residual moisture, by convention up to about 10 percent moisture for pulp and up to about 6 percent for paper. A nascent web having 50 percent water and 50 percent bone dry pulp has a consistency of 50 percent.

Products of the invention are made with a cellulosic fiber basesheet and have an absorbency or SAT value as well as tensiles and densities suitable for tissue and towel products.

Typical SAT values are greater than about 3 g/g in most cases. See U.S. Pat. No. 8,778,138.

Figure 7:
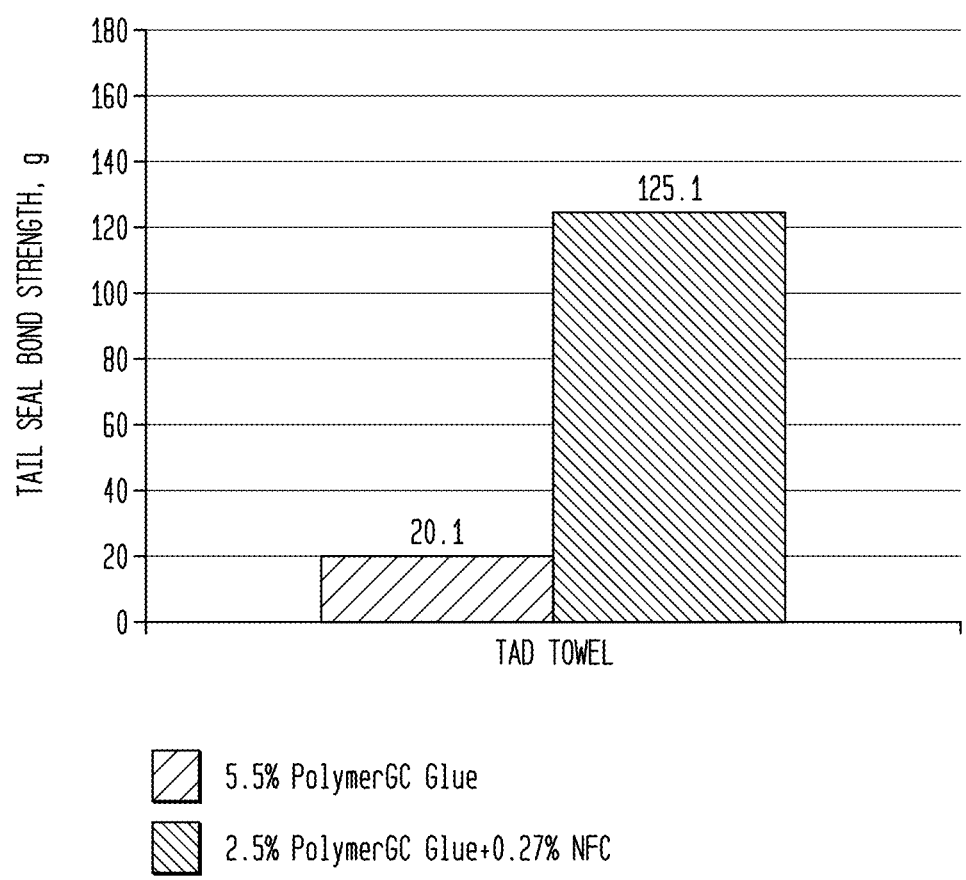
FIG. 7 is a histogram showing Tail-Seal Bond Strength for TAD towel and various adhesives.

"CWP" refers to absorbent products made by a conventional wet-press process; that is, wet-pressing a furnish to a drying cylinder with a papermaking felt followed by creping the web from the cylinder. See U.S. Pat. No. 7,951,266, FIG. 7 thereof.

"Structured" basesheet refers to product that is wet creped (fabric creped) from a cylinder prior to final drying. See U.S. Pat. Nos. 7,850,823; 7,585,388; 7,585,389; and 7,662,257.

"TAD" refers to through-air dried absorbent products. Throughdried, creped products are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer.

The absorbent characteristics of a product can be affected by the furnish, basis weight, strength, papermaking technology, and so forth. The sheet absorbency and converting technology for a specific product will impact the selection of bonding agent characteristics. CWP sheets are more consolidated than TAD sheets and therefore may have a lower wicking rate. Towel sheets commonly contain more softwood than tissue sheets, which may impact the pore size distribution of the web. It can be appreciated that an optimal bonding agent formula for one product may not be optimal for another.

A towel product is typically characterized by having predominantly (more than 50% by weight based on fiber content) softwood fiber.

A tissue product is typically characterized by having predominantly (more than 50% by weight based on fiber content) hardwood fiber.

In the examples which follow, tail-seal adhesives having the features enumerated in Tables 1-3B were tested for tail-sealing effectiveness with CWP, TAD and structured sheet products for tail-sealing effectiveness. The adhesives are typically formulated by diluting conventional adhesives and adding NFC and another modifier or combining NFC with viscosity modifiers as described hereinafter. "PolymerGC Glue" in Tables 1, 2 and 3A and throughout the specification refers to glue material made up primarily of glycols such as PEG and water soluble cellulose derivatives as is described generally in U.S. Pat. No. 6,342,297 to LaBrash. For the glue components (other than water), weight percent refers to weight percent solids. The Glycol:Cellulose derivative weight ratios appear in the tables describing the PolymerGC Glue compositions. The PolymerGC Glue components are blended with NFC to make the invention tail-seal adhesive. The adhesives may consist essentially of the listed components. Additional formulations including those based on PVOH glues which may be suitable for tail-seal adhesives, along with their properties, are described hereinafter.

TABLE 1

Representative PolymerGC Glue based NFC Containing Tail-Seal Compositions

| Component | General | Typical |
|---|---|---|
| PolymerGC Glue (wt %) | 1.5-7 | 2-6 |
| NFC (wt %) | 0.025-0.5 | 0.035-0.35 |
| PolymerGC Glue:NFC Weight Ratio | 5-125 | 10-120 |

TABLE 1-continued

Representative PolymerGC Glue based NFC Containing Tail-Seal Compositions

| Component | General | Typical |
|---|---|---|
| Glycol:CellD Weight Ratio | 2-10 | 3-7 |
| Water (wt %) | 90-99 | 94-98 |
| Other additives | balance | balance |

TABLE 2

Representative PolymerGC Glue, Viscosity Modifier Based NFC Tail-Sealing Compositions

| Component | General | Typical |
|---|---|---|
| PolymerGC Glue (wt %) | 1-5 | 2-4 |
| Viscosity Modifier (wt %) | 0.25-3 | 0.4-2 |
| NFC (wt %) | 0.25-1 | 0.4-0.7 |
| PolymerGC Glue:NFC Weight Ratio | 1-25 | 1-10 |
| Glycol:CellD Weight Ratio | 2-10 | 3-7 |
| Water (wt %) | 90-99 | 95-98 |
| Other additives | balance | balance |

TABLE 3

Representative Viscosity Modifier Based Tail-Seal Compositions

| Component | General | Typical |
|---|---|---|
| Viscosity Modifier (wt %) | 0.05-2 | 0.075-1.5 |
| NFC (wt %) | 0.05-0.75 | 0.075-0.65 |
| NFC:Viscosity Modifier Weight Ratio (%) | 2.5%-1000% | 7%-500% |
| Water (wt %) | 95-99 | 97-98.5 |
| Other additives | balance | balance |

TABLE 3A

Representative PolymerGC Glue/NFC/Viscosity Modifier Compositions with NFC:Viscosity Modifier Ratios of <100%

| Component | General | Typical |
|---|---|---|
| Viscosity Modifier (wt %) | 0.3-2 | 0.5-1.5 |
| NFC (wt %) | 0.025-0.2 | 0.035-0.15 |
| Weight Ratio, NFC:Viscosity Modifier Ratio (%) | 2.5%-75% | 3%-15% |
| PolymerGC Glue (wt %) | 0.5-5 | 1-3.5 |
| Glycol:CellD Weight Ratio | 2-10 | 3-7 |
| Water (wt %) | >90 | >95 |
| Other additives | balance | balance |

TABLE 3B

Representative NFC Viscosity Modifier Compositions with NFC:Viscosity Modifier Ratios of <100%

| Component | General | Typical |
|---|---|---|
| Viscosity Modifier (wt %) | 0.3-3 | 0.5-1.5 |
| NFC (wt %) | 0.05-0.2 | 0.75-0.15 |
| Weight Ratio, NFC:Viscosity Modifier Ratio (%) | 2.5%-75% | 3%-15% |

TABLE 3B-continued

Representative NFC Viscosity Modifier Compositions
with NFC:Viscosity Modifier Ratios of <100%

| Component | General | Typical |
|---|---|---|
| Water (wt %) | >90 | >95 |
| Other additives | balance | balance |

In Tables 2 through 3B, as well as throughout this disclosure, "viscosity modifier" refers to xanthan gum, carboxymethylcellulose, pectin and the like as herein described. Percentages in the above Tables are based on the weight of the recited component based on the weight of the aqueous composition, except that in Tables 3, 3A and 3B and sometimes hereinafter the NFC:modifier ratio in percent is the weight ratio of the two components times 100%.

In Tables 1, 2 and 3A, "CellD" (and throughout) refers to water soluble cellulose derivatives which include cellulose ethers, hydroxyethyl cellulose, hydroxyethyl cellulose (hydrophobically modified), hydroxypropyl cellulose, hydroxy propyl methyl cellulose, hydroxy propyl ethyl cellulose, hydroxymethyl cellulose, methyl cellulose, ethyl cellulose, methyl ethyl cellulose, ethylhydroxyethyl cellulose, cyanoethylcellulose, cellulose gum, carboxymethylcellulose, carboxymethyl hydroxyethyl cellulose, calcium carboxymethylcellulose, sodium carboxymethylcellulose, and the like. Commercially available cellulose derivatives include Klucel® from Aqualon which is hydroxypropylcellulose; Methocel® from Dow Chemical Co. which is hydroxypropyl methyl cellulose; and Cellosize® QP 100MH from Union Carbide which is hydroxyethylcellulose that has been surface treated to be water dispersible or quick processed having a viscosity of about 100,000 cps with 2% solids. J-75MS® from Dow Chemical is hydroxypropylmethyl cellulose which has been surface treated and has a 2% solution viscosity of 75,000 cps. CMC 7H® from Aqualon is sodium carboxymethylcellulose having a high viscosity range. A preferred water soluble cellulose derivative is hydroxy propyl cellulose, preferably hydroxy propyl methyl cellulose. The water soluble cellulose derivative is present in the composition in an amount of at least about 0.5 to about 2% by weight, preferably about 0.8 to about 1.0% by weight.

"Water soluble polyols" to make the composition of the present invention include water soluble monomeric polyol, water soluble polymeric polyol, especially including PEG, glycols in general, functionalized polymeric polyol and combinations thereof. In some cases, when we refer to water soluble polyols, we refer to polyols other than PVOH.

The water soluble monomeric polyol includes any polyol such as diol, triol, tetraol and combinations thereof, having a molecular weight of less than 400. Examples of water soluble monomeric polyol are glycerin, propylene glycol, diethylene glycol, dipropylene glycol, triethylene glycol and tetramethylene glycol. Commercially available glycols include water soluble 75-H series, UCON lubricants from Union Carbide.

The water soluble polymeric polyol includes polyols having molecular weights from about 400 to about 12,000, preferably about 400 to about 10,000 or optionally up to 8,000. The water soluble polymeric polyol includes water soluble polymeric polyol such as polyethylene glycol, polypropylene glycol and mixtures thereof. Commercially available glycols include polyethylene glycols such as polyethylene glycol 8000® from Dow Chemical Co. and Carbowax® from Union Carbide, polyethylene wax emulsions and paraffin wax emulsions.

The functionalized polymeric polyol includes polyester polyol, polyether polyol, polyesterether polyol, polyhydroxy compounds and combinations thereof. The functionalized polymeric polyol may be present in an amount of about 0.2% to about 5% by weight, preferably about 0.5% to 2% by weight, most preferably about 0.3% to about 1% by weight.

The functionalized polyols can be either low or high molecular weight materials and in general will have average hydroxyl values as determined by ASTM E 222-67, Method B, between about 1000 and 10 and preferably between about 500 and 50.

The functionalized polyol component may comprise an acid grafted polyether polyol such as polypropylene oxide grafted with for example, maleic or fumaric acid as taught in Frentzel, U.S. Pat. No. 4,460,738 or Knopf U.S. Pat. No. 4,528,334 and are incorporated herein by reference. Other polyester polyols produced from mixtures of di- and tri- or higher functional acid and polyol components in ratios which provide residual acid functionality as well as plural hydroxy groups may be employed.

Polyester polyol can be prepared by polyesterification of organic polycarboxylic acid or anhydride thereof with organic polyols. Usually, the polycarboxylic acid and polyol are aliphatic or aromatic dibasic acids and diols. Any ester of the monomeric polyol and polymeric polyol can be used. Examples of these are fatty esters of polyethylene glycols having a molecular weight of about 400 to about 12,000, preferably about 800 to about 8,000. Suitable polyester polyols are sold by Ruco Corp. Other polyester polyol includes Myrj® 45 from ICI which is a polyoxyl 8 stearate.

Alternatively, the polyol component may comprise a mixture of a polyol free of acid functionality and an acid functional compound having hydroxy, amine or thiol functionality. Suitable acid functional compounds include hydroxy and mercaptocarboxylic acids, aminocarboxylic acids, aminohydroxycarboxylic acids, hydroxysulfonic acids, aminosulfonic acids and aminohydroxysulfonic acids. Representative non-limiting examples of such acids include dimethylolpropionic acid, glycolic acid, thioglycolic acid, lactic acid, maleic acid, dihydroxymaleic acid, tartaric acid, dihydroxytartaric acid, 2,6-dihydroxybenzoic acid, oxaluric acid, anilidoacetic acid, glycine, α-alanine, 6 aminocaproic acid, the reaction products of ethanolamine and acrylic acid, hydroxyethylpropionic acid, 2 hydroxyethanesulfonic acid and sulphanilic acid.

The most suitable functionalized polymeric polyols include polyalkylene ether polyol including thioethers, polyester polyols including polyhydroxypolyesteramides, and hydroxy containing polycaprolactones. Any suitable polyalkylene ether polyol may be used. Included are polyoxytetramethylene glycol, polyoxyethyleneglycol, polypropylene glycol and the reaction products of ethylene glycol with a mixture of propylene oxide and ethylene oxide. Commercially available water soluble polyethylene oxide includes Polyox® from Union Carbide.

Also useful are polyether polyols formed from the oxyalkylation of various polyols. For example, glycols such as ethylene glycol, 1,6 hexanediols, Bisphenol A and the like, higher polyols such as trimethylolpropane, trimethylethane, pentaerythritol and the like. Polyols of higher functionality which can be utilized as indicated can be made for instance by oxyalkylation of compounds such as sorbitol or sucrose. One commonly utilized oxyalkylation method is by reacting a polyol with an alkylene oxide, for example, ethylene or propylene oxide in the presence of an acidic or a basic catalyst.

The polyhydroxy compounds can have a molecular weight of at least about 400 to about 3,000, preferably about 1,000 to about 2,000. Examples of polyhydroxy compounds include sorbitol, mannitol, corn syrup, dextrin, fructose, sucrose and combinations thereof. The polyhydroxy compound is present in an amount of about 0.5% to about 5% by weight, more preferably about 0.5 to about 3% by weight.

It will be appreciated from the foregoing and the discussion hereinafter that when we refer to water soluble polyols, in many cases we refer to polyols other than PVOH.

Tail-Sealing

Referring to FIG. 1, there is shown a tissue roll 10 having a body 12 wherein a free end 14 of an initial portion 16 of tail 15 is pressed against underlying convolution 18 of body 12 so that a bonding agent line 20 adheres tail 15 to convolution 18 of body 12. Line 20 is applied along the width of roll 10 as indicated in FIG. 1 which is a view in section and elevation of the roll. It will be appreciated that the bonding agent flattens and adheres to the rolled tissue, forming a bond between the layers. The embodiment of FIG. 1 is referred to as a flat tail-seal.

Figure 2:
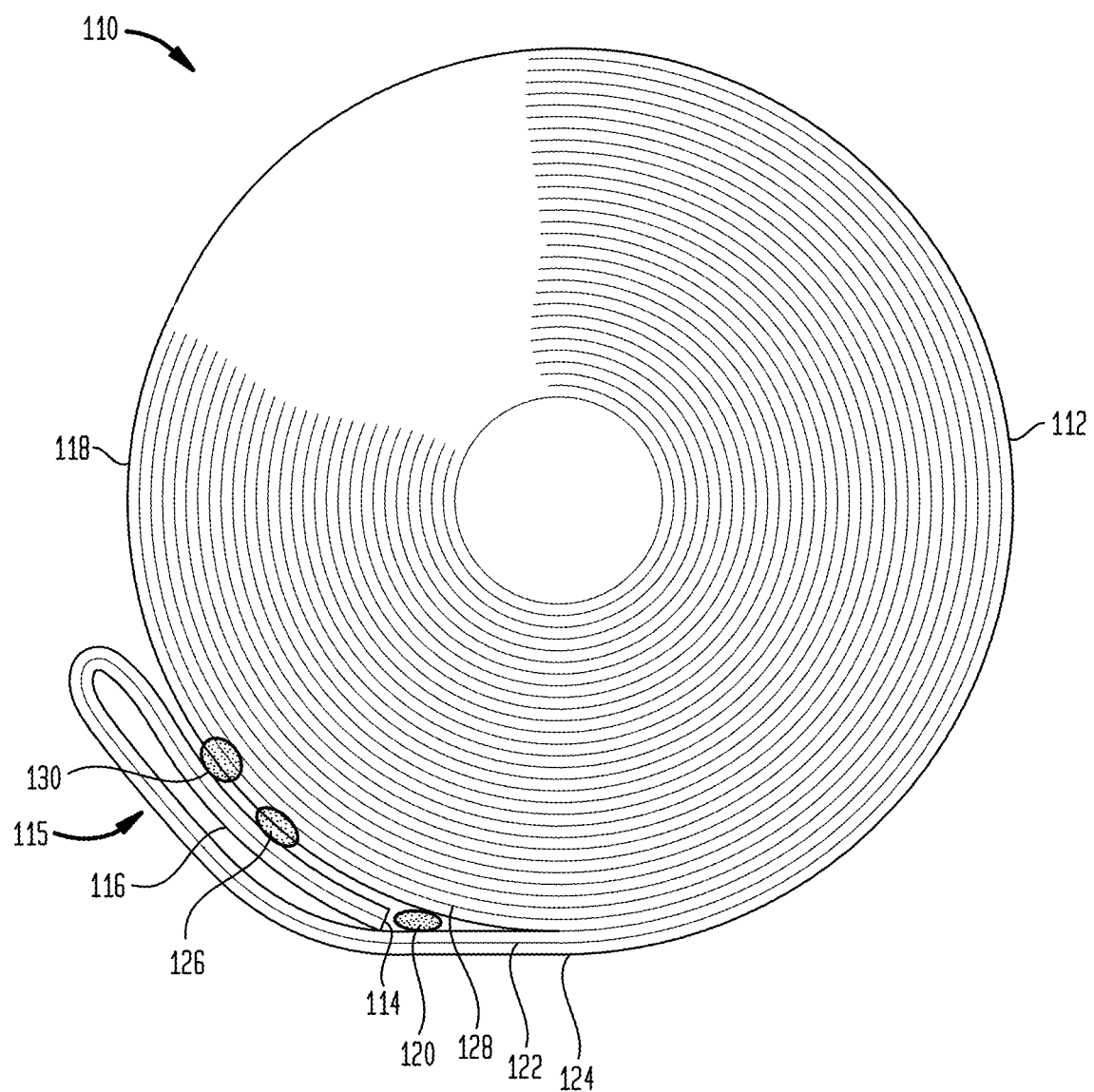
FIG. 2 is a schematic sectional view illustrating folded tail-sealing a tissue roll, including pressing the folded end of the roll against the body of the roll.

Products of the invention may also be produced using the methodology disclosed in U.S. Pat. No. 7,799,402 to Redmann et al. In FIG. 2 there is shown a tissue log 110 having a body 112 wherein a free end 114 of an initial sheet 116 of tail 115 has been pressed against the underlying convolution 118 of body 112 so that a bonding agent line 120 remains spaced from a perforation line at 122 adjoining sheets 116, 124, while a primary bonding agent line 126 remains spaced from perforation line 122 and a second perforation line at 128. Optionally, there is provided a third bonding agent line 130 to adhere tail 115 to underlying convolution 118. In FIG. 2, the bonding agent lines are indicated schematically to show placement, only; here again it will be appreciated that the bonding agent flattens and adheres to the rolled tissue, penetrating the tissue to some degree. The embodiment of FIG. 2 is referred to as a folded tail-seal.

Lines of relatively dilute adhesive or bonding agent of the invention for tail-sealing a rolled product may be applied using a variety of methodologies including extrusion, wire coating or spraying. Typical methods of applying liquid tail-seal compositions are shown in FIGS. 3, 4 and 5.

Figure 3:
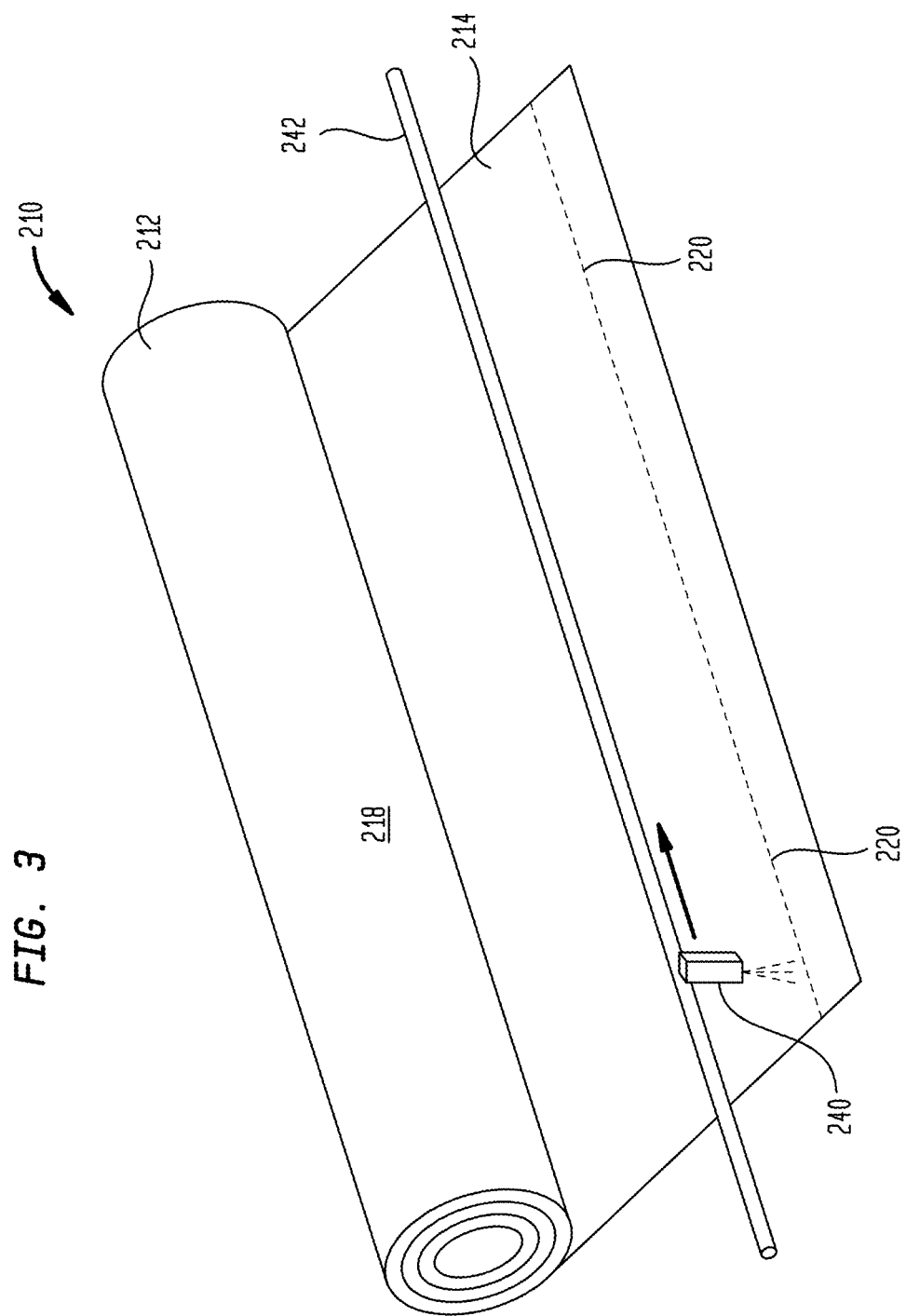
FIG. 3 is a schematic diagram illustrating tail-sealing of a tissue log utilizing a traveling spray head.

In FIG. 3 there is shown a tissue log 210 having a body 212 wherein a free end 214 is sprayed with bonding agent to provide a spray-line 220 of bonding composition along the width of log 210. The bonding agent is sprayed with a traveling spray head 240 which traverses the width of log 210 applying spray line 220 in any suitable amount. Traveling head 240 is disposed on a boom 242 which supports the head as it moves over the length of the log. After spraying, free end 214 bearing the bonding agent is pressed against underlying convolution 218 to provide the tail-seal.

Figure 4:
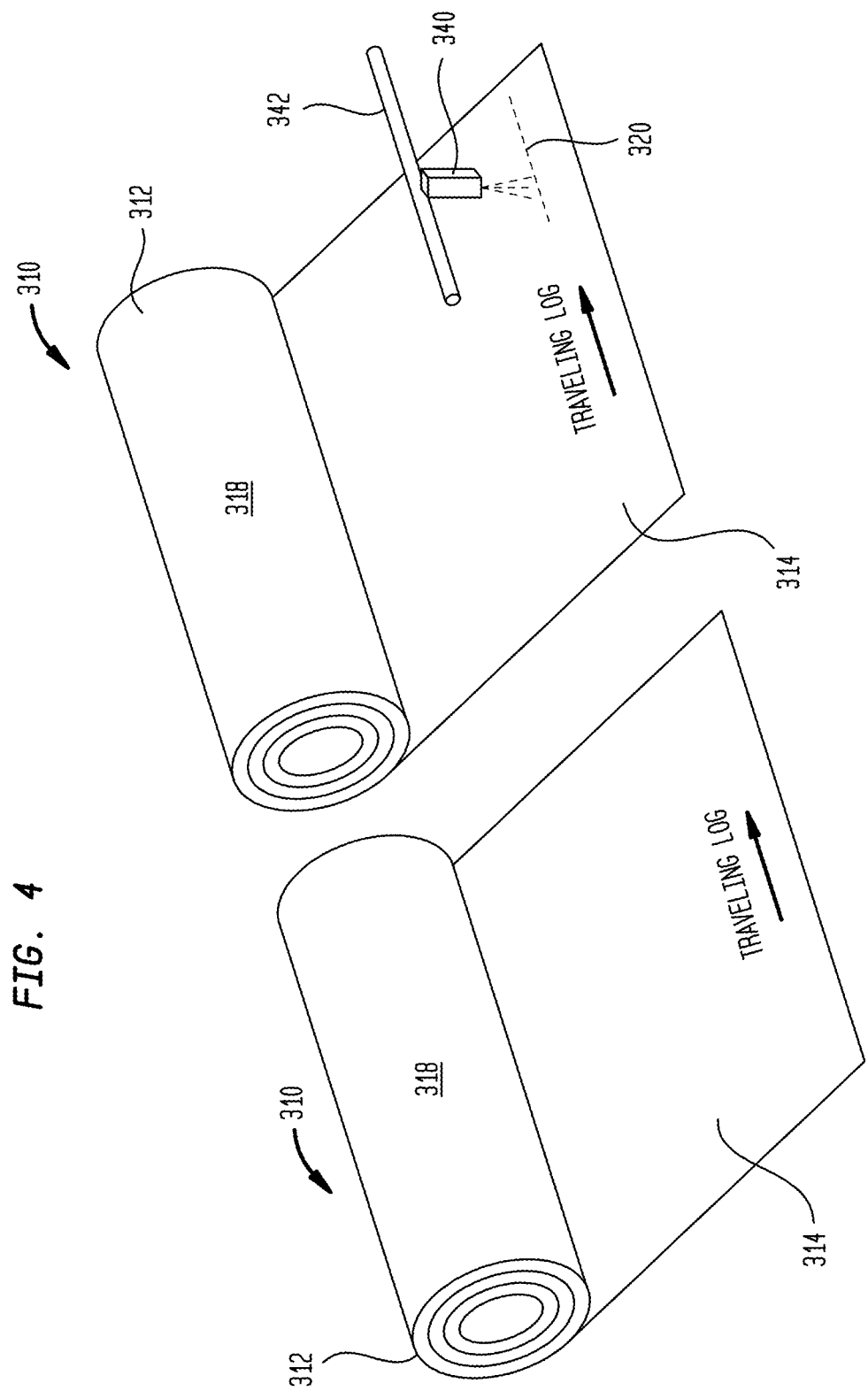
FIG. 4 is a schematic diagram illustrating tail-sealing of tissue logs using a stationary spray head to apply tail-sealing composition to travelling tissue logs in a production line.

Instead of a traveling spray head, sometimes a stationary spray head 340 is employed as is shown in FIG. 4. In FIG. 4 there is shown tissue logs 310, each having a body 312 wherein a free end 314 is sprayed with bonding agent to provide a spray line 320 of bonding composition along the width of log 310. Head 340 is stationary and mounted on a boom 342 and applies line 320 as the logs are conveyed sequentially under spray head 340 along a production direction. Spray line 320 may be applied in any suitable amount, typically such as anywhere from 10-70 mg of aqueous bonding agent per cm of width of the log. Following application of spray line(s) 320, free ends 314 with the line of adhesive are pressed against underlying convolutions 318 to tail-seal tissue logs 310.

Figure 5:
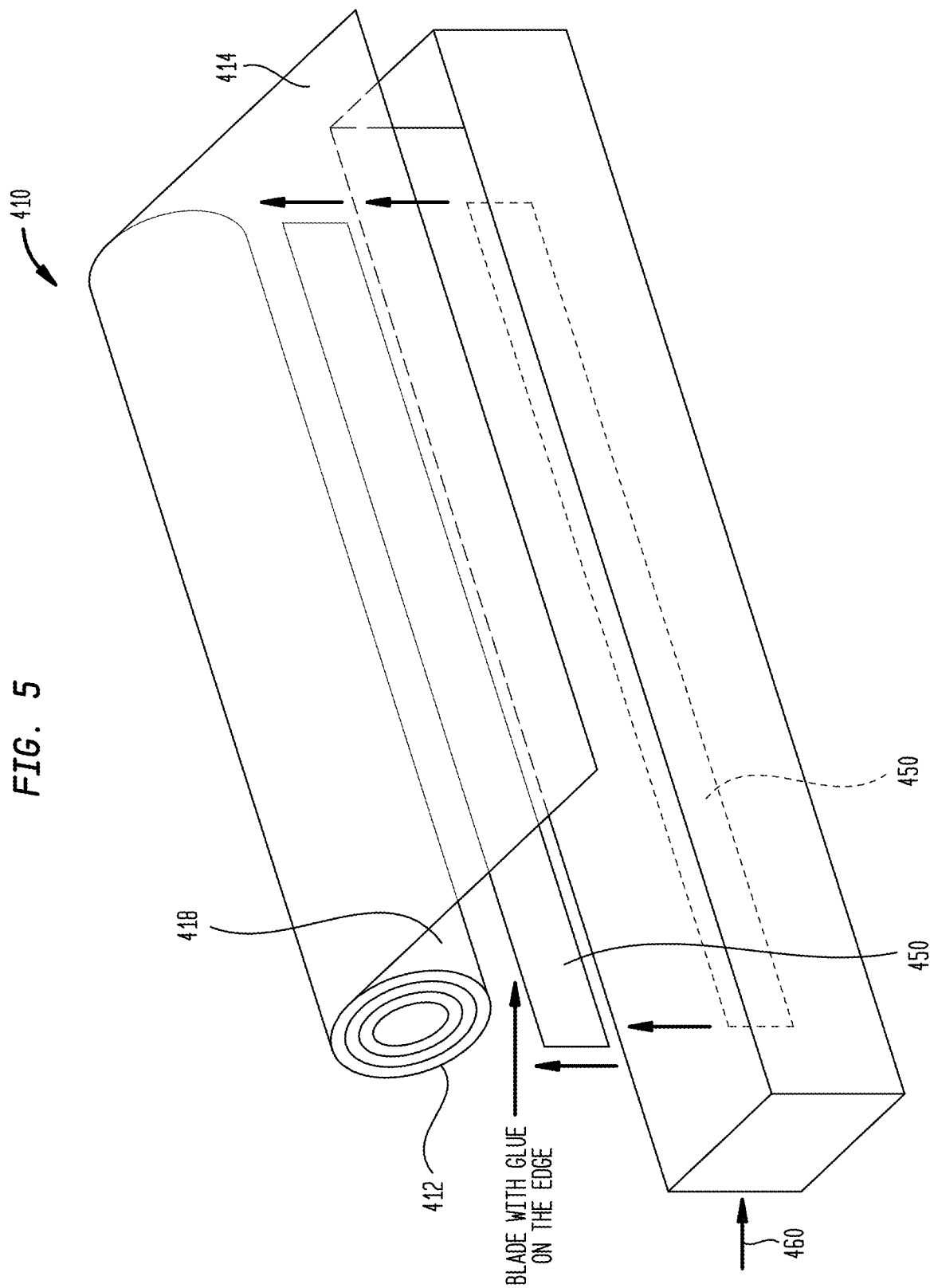
FIG. 5 is a schematic diagram illustrating tail-sealing using a wire coating blade to apply a glue line to a tissue log.

Still another tail-sealing methodology is illustrated schematically in FIG. 5. In FIG. 5 there is shown a tissue log 410 having a body 412 when a free end 414 is wire coated with a blade 450 to provide a glue line (not shown) on free end 414 of log 410 along the width of the log. Blade 450 is submersed in a glue tank 460 and has a wire rod on its upper edge. As the blade reciprocates upwardly after being submersed in glue tank 460 and contacts free end 414 it applies a glue line. Following application of the tail-sealing composition, free end 414 with the adhesive is pressed against underlying convolution 418 to tail-seal free end 414 to underlying convolution 418.

Particulars of automated operation with a pneumatic glue gun are seen in U.S. Pat. No. 7,967,933 to Redmann et al.

For purposes of laboratory testing, tail-sealing composition may be applied using an automated syringe to apply a glue line as discussed below.

In connection with any of the methods of application, tail-sealing composition may be applied as glue lines in amounts anywhere from 10-70 mg/cm of width of the rolled product.

EXAMPLES

Laboratory tail-sealing testing was conducted with an automated tail-sealing apparatus on rolls of 2-ply absorbent sheet product. The tails of sample rolls were placed under a 100 ml syringe dispenser. A control box regulated the dispensing speed of tail-seal adhesive and the pressure to dispense. The amount of dispensing tail-seal glue can also be controlled by using different tip size of syringe tips. To determine the weight of tail-seal glue that is applied on a 4 inch wide tissue roll along a tail-seal adhesive line, a blotter paper cut to 4"×4" was used. The weight differences of the blotter paper before and after the tail-seal application indicates the weight of tail-seal that applied on the sample roll. After each tail-seal application on the sample roll, the roll was gently rolled to close the tail and aged at room temperature for a minimum of 24 hours before testing for tail-seal bond strength. After aging, tail-seal bond strength was measured as described hereinafter. Utilizing this automated syringe application methodology, followed by tail-seal bond strength measurements a series of tail-sealing trials were carried out using 2-ply TAD, CWP and Structured roll products.

Examples 1-10

Figure 6:
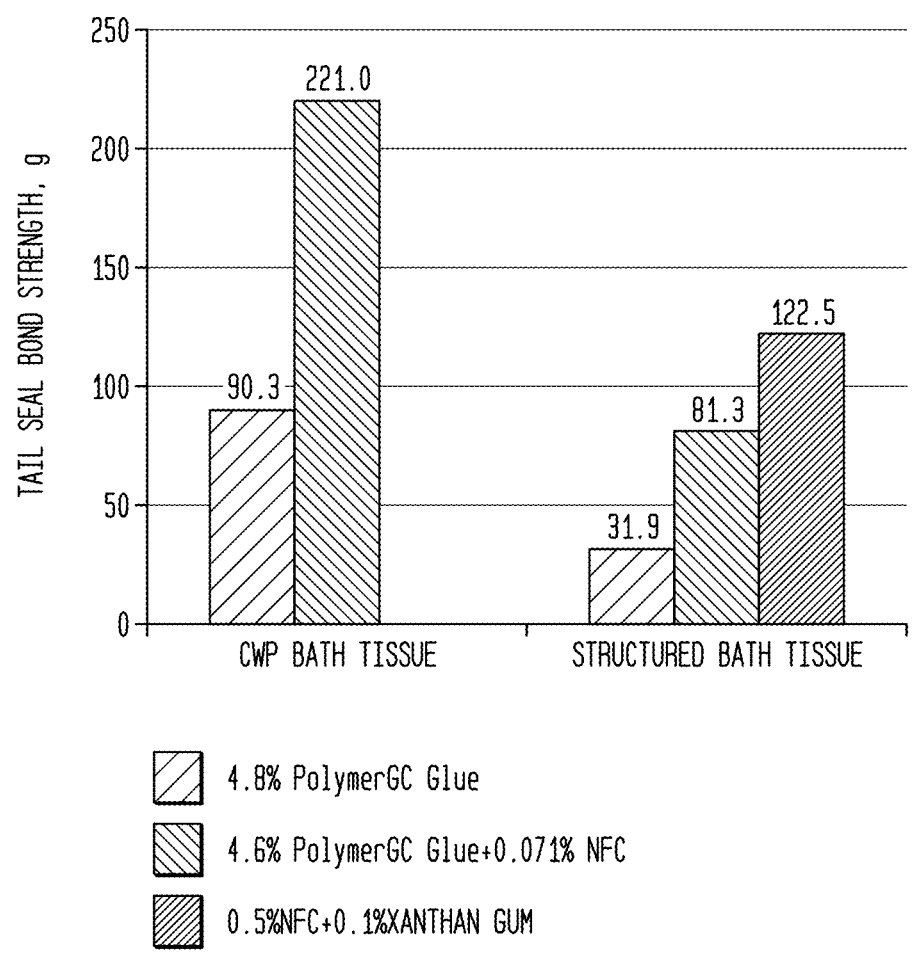
FIG. 6 is a histogram showing Tail-Seal Bond Strength for various tissue products and adhesives.

A first series of experiments were carried out using the materials enumerated in Table 4, where results also appear. It is seen that a variety of NFC Tail-Sealing Adhesives are effective to bond the tail-seal, with the composition and application level influencing the Tail-Seal Bond Strength. Optimum levels are readily achieved. Results seen in Table 4 are presented graphically in FIGS. 6 and 7.

TABLE 4

Tail-Seal Trials Examples 1-10

| Example | Adhesive | Product | Tail-Seal Bond Strength (g) | Glue wt. (g) | Evaluation |
|---|---|---|---|---|---|
| 1 | 4.8% PolymerGC Glue | CWP Tissue | 90 | 0.134 | Acceptable Bond |

TABLE 4-continued

Tail-Seal Trials Examples 1-10

| Example | Adhesive | Product | Tail-Seal Bond Strength (g) | Glue wt. (g) | Evaluation |
|---|---|---|---|---|---|
| 2 | 4.8% PolymerGC | Structured Tissue | 32 | 0.134 | Too Light |
| 3 | 4.6% PolymerGC Glue/0.071% NFC | CWP Tissue | 221 | 0.128 | Too Strong/ Ply Separation |
| 4 | 4.6% PolymerGC Glue/0.071% NFC | Structured Tissue | 81 | 0.128 | Acceptable Bond |
| 5 | 0.5% NFC/ 0.1 XG | Structured Tissue | 122 | 0.127 | Acceptable Bond |
| 6 | 0.25% NFC/ 0.1% XG | Structured Tissue | 29 | — | Too Light |
| 7 | 0.25% NFC/ 0.1% XG | CWP Tissue | 48 | — | Too Light |
| 8 | 5.5% PolymerGC Glue | TAD Towel | 20 | 0.153 | Too Light |
| 9 | 2.5% PolymerGC Glue/0.27% NFC | TAD Towel | 38 | 0.108 | Too Light |
| 10 | 2.5% PolymerGC Glue/0.27% NFC | TAD Towel | 125 | 0.224 | Acceptable Bond |

Examples 11-18

Examples 11-18 were conducted following generally the procedures of Examples 1-10. In Examples 11-18, 2-ply tissue rolls were used and the amount of Tail-Seal Adhesive applied was adjusted to 0.328 g/roll. A different set of adhesives were used, as is enumerated in Table 5. Results are presented graphically in FIG. 8 and details appear in Table 6.

TABLE 5

Tail-Seal Adhesives

| Material | Components |
|---|---|
| Control | PolymerGC Glue (diluted to 5%) |
| CH1 | 5.5% PolymerGC Glue + 0.048% NFC (Total solids 5.548%) |
| CH2 | 0.1% NFC + 1.35% XG (total solids 1.45%) |
| CH3 | 2.9% Glycol/CellD + 0.675% XG + 0.05% NFC (total solids 3.625%) |

TABLE 6

2-Ply Tissue Tail-Seal Results

| Example | Tissue/Chemistry | Tail-Seal Bond Strength (g) |
|---|---|---|
| 11 | Structured/Control | 65 |
| 12 | CWP/Control | 118 |
| 13 | Structured/CH1 | 123.4 |
| 14 | CWP/CH1 | 221.8 |
| 15 | Structured/CH2 | 275.8 |
| 16 | CWP/CH2 | 372.5 |
| 17 | Structured/CH3 | 286.5 |
| 18 | CWP/CH3 | 523.8 |

In the foregoing examples, the adhesive contents designated PolymerGC Glue are actually diluted commercial adhesives based mostly on PEG and water soluble cellulose derivatives as noted above. Weight percents refer to the percentage of solids which approximates glycol and cellulose levels. In particular, In Examples 1-18 the weight percent Glycol/CellD is based on diluted solids content in commercial adhesive compositions, Fuller WB4955MX2 and WB4959 which are predominantly PEG and cellulose based compositions. The solids content of these compositions in the adhesives is thus referred to as PolymerGC Glue.

Figure 8:
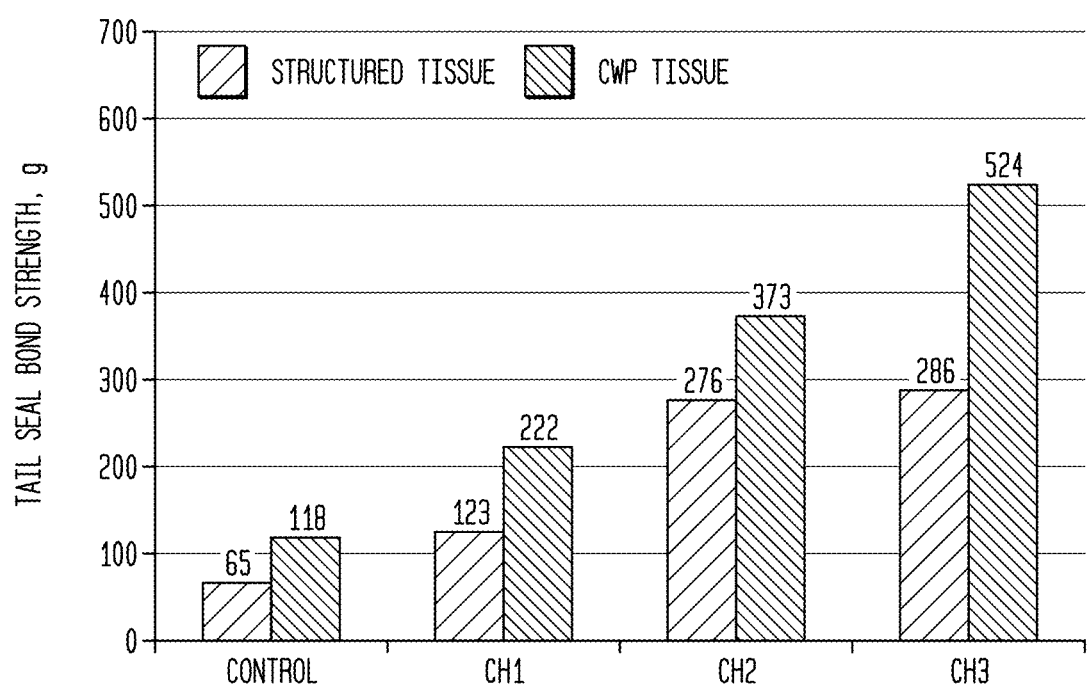
FIG. 8 is a histogram showing Tail-Seal Bond Strength for various tissue products with different adhesives.

Compared to Examples 1-10, doubling the amount of tail-seal adhesive resulted in much stronger tail-seal bond and the results covered a much wider bond range (FIG. 8). However, different tail-sealing chemistries provide different amount of bonding. Obtaining a wide range of tail-seal bond allows a great deal of freedom to select the optimal recipe for a given method and product. No plybond separation was observed in Examples 11-18, despite some very high Tail-Seal Bond strengths. Although all the tail-seals were found more or less to have penetrated multiple layers under the last ply, the ply bond that formed by the penetrated tail-seals was very weak and could be easily torn apart.

Due to the significantly different chemistry of tail-seal chemicals used in Examples 11-18, the viscosity analysis was conducted to compare the rheological properties of these tail-seal adhesives. Results appear in Table 7 and are presented graphically in FIG. 9.

TABLE 7

Adhesive Viscosity

| Shear rate 1/s | Control Viscosity cP | CH1 Viscosity cP | CH2 Viscosity cP | CH3 Viscosity cP |
|---|---|---|---|---|
| 0.5 | 1456 | 2733 | 20855 | 11537 |
| 0.8 | 1362 | 2511 | 14710 | 8293 |
| 1.3 | 1262 | 2267 | 10590 | 5752 |
| 2.0 | 1151 | 2010 | 7418 | 3913 |
| 3.2 | 1030 | 1757 | 5065 | 2644 |
| 5.0 | 910.2 | 1515 | 3432 | 1790 |
| 7.9 | 793.2 | 1283 | 2322 | 1216 |
| 12.6 | 678.7 | 1069 | 1563 | 830.4 |
| 19.9 | 569.3 | 873.8 | 1043 | 569.9 |
| 31.5 | 467.1 | 697.2 | 691.4 | 395.3 |
| 50.0 | 375.4 | 544.6 | 457.3 | 277.2 |
| 79.2 | 295.8 | 419.5 | 302.9 | 197.2 |
| 125.6 | 230.6 | 319.7 | 202.3 | 142.7 |
| 199.1 | 178.4 | 241.8 | 136.5 | 104.6 |
| 315.5 | 137.0 | 182.0 | 93.4 | 78.46 |
| 500.0 | 104.6 | 136.7 | 65.12 | 59.36 |
| 792.4 | 79.7 | 102.7 | 46.17 | 45.58 |
| 1255.9 | 60.8 | 77.28 | 33.30 | 35.5 |
| 1990.5 | 46.8 | 58.6 | 24.5 | 28.1 |
| 2000.0 | 46.8 | 58.6 | 24.4 | 28.0 |

Figure 9:
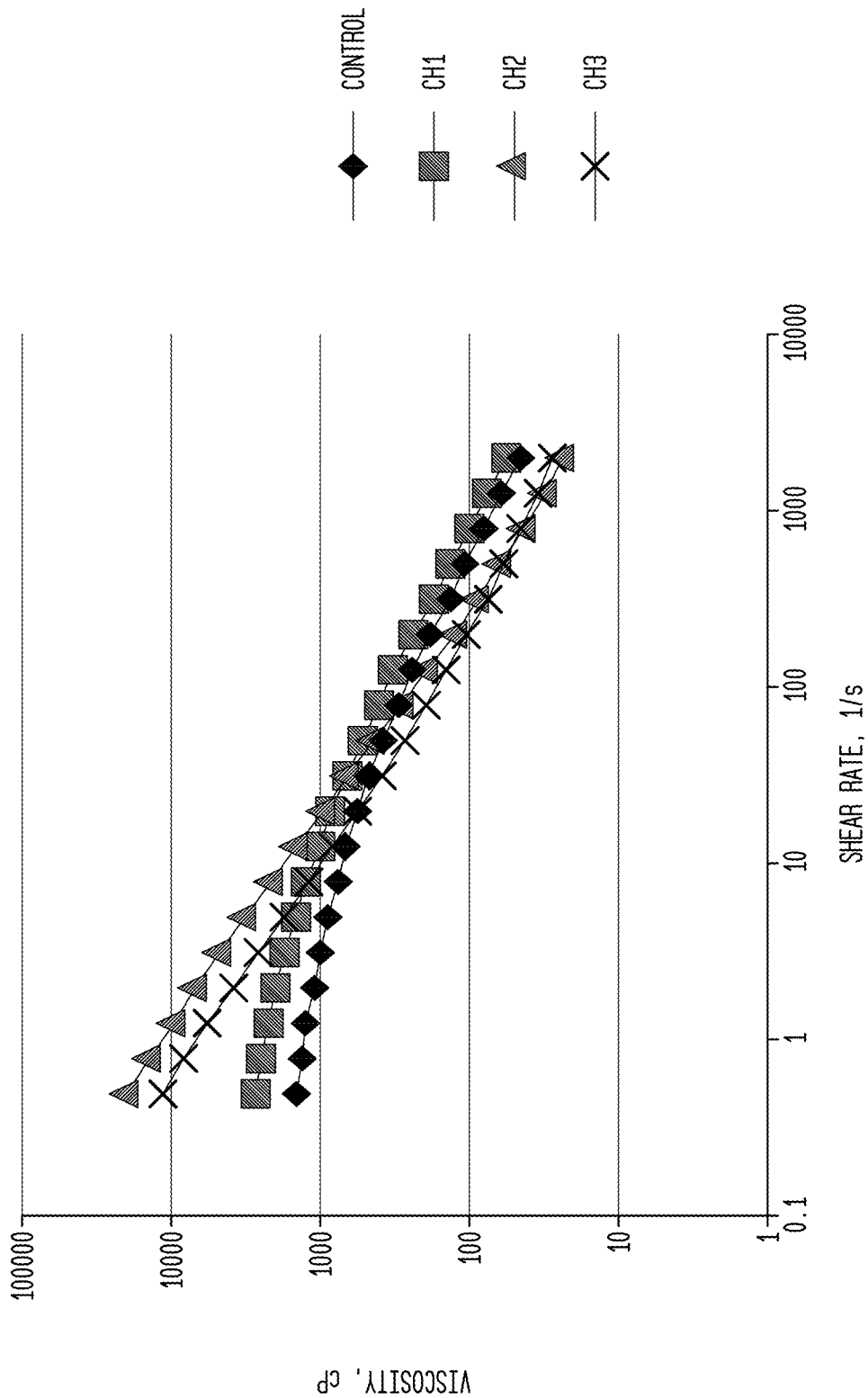
FIG. 9 presents a viscosity analysis for various adhesives.

As shown in FIG. 9, all the tail-seal chemicals show shear thinning properties. The control and CH1 have very similar viscosity behavior while CH2 and CH3 have higher viscosity at very low shear rate but the viscosity decreases quickly when agitation starts. During the trials, all the tail-seal chemicals were applied with very similar weight at the same experimental settings. Therefore, the differences in viscosity were not considered a critical factor that affects tail-sealing adhesive application.

The CH2 and CH3 chemistries include relatively low ratios of NFC with respect to the viscosity modifier which can be viewed in these types of compositions, i.e. where the amount of viscosity modifier is greater than the amount of NFC, as a glue resin modified with NFC as a strength agent.

Testing Dry tensile strengths, stretch, ratios thereof, modulus, break modulus, stress and strain are measured with a standard Instron test device or other suitable elongation tensile tester which may be configured in various ways, typically using 3 or 1 inch wide strips of material, suitably conditioned in an atmosphere of 23°±1° C. (73.4°±1° F.) at 50% relative humidity for 2 hours. This conditioning method is preferably employed for all specimen testing. The tensile test is typically run at a crosshead speed of 2 in/min. Tensile strength is sometimes referred to simply as "tensile" and is reported herein for NFC as breaking length (km), which is the tensile in kg/m divided by the basis weight of the sample in g/m$^2$. See U.S. Pat. No. 8,409,404 for additional measurements and details.

The term "Characteristic Breaking Length" when referring to NFC refers to the breaking length of a handsheet or film made from 100% of the NFC. The handsheet (50-70 g/m$^2$) is made by using vacuum filtration and a suitable membrane as is described in more detail hereinafter followed by restrained air drying.

The modulus of a specimen (also referred to as stiffness modulus or tensile modulus) is determined by the procedure for measuring tensile strength described above, using a sample with a width of 1 inch, and the modulus recorded is the chord slope of the load/elongation curve measured over the range of 0-50 grams load. The specific modulus is the modulus divided by density.

Characteristic Nanofiber Viscosity and Bonding Agent Viscosity

Characteristic Nanofiber Viscosity is measured on a 1 wt % suspension of the subject NFC in water.

Viscosity of the glues and NFC suspensions is measured at room temperature, using a TA instruments Discovery Hybrid Rheometer (DHR) 2. A cone and plate geometry was used for analysis. A few drops of sample were placed on a flat metal pettier plate and the cone spindle, which has a 60 mm diameter and 2° angle, was brought down to make contact with the sample to initiate the spreading action. The sample that flowed out of the circumference of the cone spindle was trimmed. The experimental conditions were as follows: flow logarithmic sweep, shear rate 0.5-2000 Hz at room temperature. Trim and geometric gap was 54 microns. Room temperature means ambient temperature between 23° C. and 29° C., typically. If a specific value is required, 25° C. is used.

Tail-Seal Bond Strength

The strength of the bond between the tail of a 4" tissue or 4" towel roll was determined as follows.

The roll samples were conditioned and tested in an atmosphere of 23.0±1.0° C., 50%±2% R.H. For each specimen, the back of the roll was slit on the opposite side of the tail seal bond with a razor blade, and several layers of tissue were peeled off the roll. The tissue with the seal was placed facing down, and extra layers of tissue were removed until only two complete sheets remain. Each of the specimens was cut into 3 in.×5 in. so that the length will be in the machine direction. The tail seal area should face up and be placed 0.5 in. from one end of the cut edges.

The testing of tail seal bond strength was conducted by a tensile tester with a 3.0±0.1 in. jaw span and a crosshead speed of 2.0 in/min. The specimen was held with the tail seal facing away and hanging down. The specimen was inserted into the grip, and clamped in the upper and lower grips with proper slack. If there is a perforation directly below the tail seal or below the top jaw that breaks before the tail seal pulls apart, a clear tape is placed over the perforation to prevent it from breaking first. For each sample, the average, standard deviation bond strength is reported and the number of test replications. The tail seal bond strength of 100-150 g is considered optimal for both tissue and towel.

Nanofibrillated Cellulose

NFC is commonly produced by mechanically disintegrating wood pulp, such as hardwood or softwood Kraft pulp which can include chemical pre- or post-treatments. The pulp used may be pre-processed enzymatically or chemically, for example, to reduce the quantity of hemicellulose. Furthermore, the cellulose fibers may be chemically modified, wherein the cellulose molecules contain functional groups other than in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose).

Generally, a high shear zone is formed during disintegration to delaminate multilayer cell walls of wood fibers and separate fibrils while minimizing cutting and entangling. This process is used to isolate high aspect ratio, semi-crystalline cellulose fibrils with robust mechanical properties from the wood furnish. Nanofibrils are typically on the order of 4-20 nm wide and 500-2000 nm long. They possess good axial tensile strength due to inter- and intra-molecular hydrogen bonding among highly oriented cellulose molecules. Various processes suitable for making NFC are described in the following references: United States Patent Application Publication No. US 2011/0277947, entitled "Cellulose Nanofilaments and Method to Produce Same", of Hua et al.; United States Patent Application Publication No. US 2014/0083634, entitled "Method and an Apparatus for Producing Nanocellulose", of Bjoerkqvist et al.; and United States Patent Application Publication No. US 2014/0284407, entitled "A Method for Producing Nanofibrillar Cellulose", of Tamper et al.

The fiber morphology influences the amount of energy required to disintegrate it into NFC. Delamination can be facilitated by weakening fiber cell walls or decreasing the strength of fiber-to-fiber bonds through enzymatic or oxidative pretreatments as noted above. Pretreatments can be targeted to certain regions of the fiber or cause a general weakening effect. For example, cellulase enzymes degrade the amorphous portion of the fiber, whereas the TEMPO oxidation weakens the entire surface of the fiber by decreasing the degree of polymerization of cellulose. The TEMPO pretreatment weakens the fiber indiscriminately by converting primary hydroxyl groups of polysaccharides to carboxyl groups. The same techniques can also be used after mechanical fibrillation to achieve a desired quality of NFC. The choice and extent of pretreatment, as well as the morphology of the starting material, will influence the morphology of the nanofibrillated cellulose produced. For example, pulps that undergo extensive enzymatic hydrolysis before disintegration tend to be more uniform in size with a higher degree of crystallinity. With a lower fraction of amorphous cellulose, these fibers look more like cellulose nanocrystals and have a lower specific surface area. Mechanical disintegration with a microgrinder will increase the surface area of the fibrils and cause more branching. For glue reinforcement applications, this is a desired outcome as greater surface area will increase the amount of interfacial bonding with the matrix glue.

Further details concerning making NFC or MFC with peroxide or ozone are seen in U.S. Pat. No. 7,700,764 to Heijnesson-Hultén, entitled Method of Preparing Microfibrillar Polysaccharide (Akzo Nobel N.V.); United States Patent Application Publication No. US 2015/0167243 of Bilodeau et al., entitled Energy Efficient Process for Preparing Nanocellulose Fibers (University of Main System Board of Trustees); and U.S. Pat. No. 8,747,612 to Heiskanen et al., entitled Process for the Production of Microfibrillated Cellulose in an Extruder and Microfibrillated Cellulose Produced According to the Process (Stora Enso OYJ). Discussion relating to making NFC or MFC with N-oxyl compounds is seen in U.S. Pat. No. 8,992,728 to Isogai et al., entitled Cellulose Nanofiber, Production Method of Same and Cellulose Nanofiber Dispersion (University of Tokyo); U.S. Pat. No. 8,377,563 to Miyawaki et al., entitled Papermaking Additive and Paper Containing the Same (Nippon Paper Industries Co., Ltd.); and U.S. Pat. No. 8,287,692 to Miyawaki et al., entitled Processes for Producing Cellulose Nanofibers (Nippon Paper Industries Co., Ltd.) which discloses a process for making nanofibers using N-oxyl compounds (TEMPO). References for making NFC or MFC with enzymes include U.S. Pat. No. 8,778,134 to Vehvilainen et al., entitled Process for Producing Microfibrillated Cellulose (Stora Enso OYJ); U.S. Pat. No. 8,728,273 to Heiskanen et al., entitled Process for the Production of a Composition Comprising Fibrillated Cellulose and a Composition (Stora Enso OYJ); U.S. Pat. No. 8,647,468 to Heiskanen et al., entitled Process for Producing Microfibrillated Cellulose (Stora Enso OYJ) which proposes two enzymatic treatments of the pulp used to make microfibers; and U.S. Pat. No. 8,546,558 to Ankerfors et al., entitled Method for the Manufacture of Microfibrillated Cellulose (STFI-Packforsk AB) which also relates to the use of an enzyme treatment.

NFC may be obtained through the University of Maine; see "The University of Maine—The Process Development Center—Nanofiber R & D," [Online]. Available: http://umaine.edu/pdc/nanofiber-r-d/. [Accessed 24 Nov. 2014]. This source is referred to as NFC I in the text and Figures. NFC may also be obtained from Paperlogic, operator of the first US commercial nanocellulose plant at the former Southworth Paper and now Paperlogic mill in Turners Falls, Mass. This source is referred to as NFC II in the text and Figures.

Figure 10A:
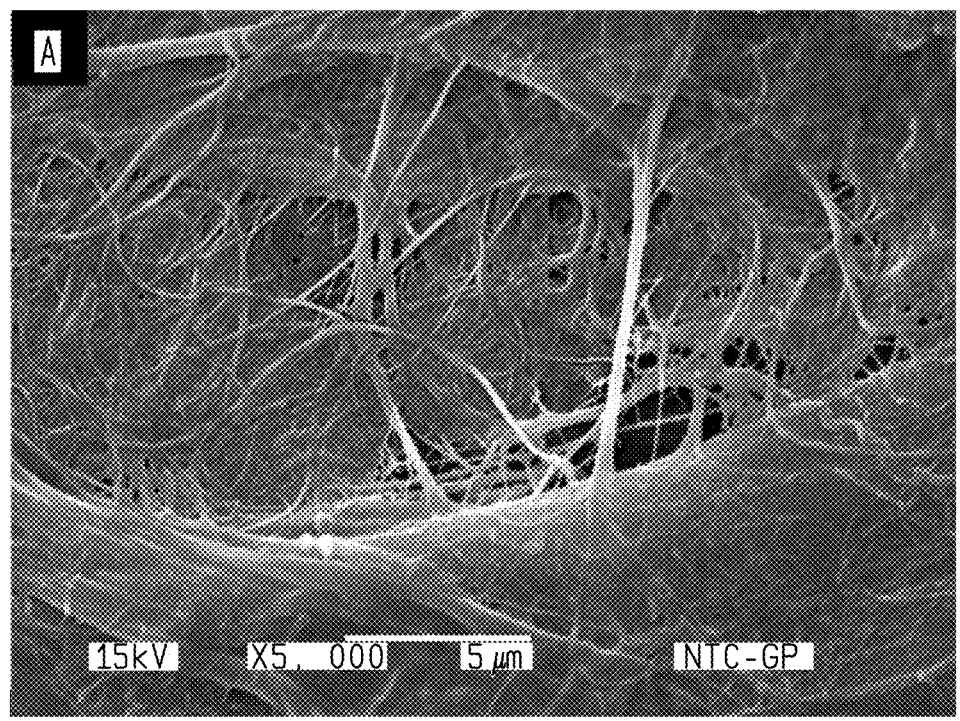
FIGS. 10A and 10B are scanning electron micrographs of NFC.
Figure 10B:
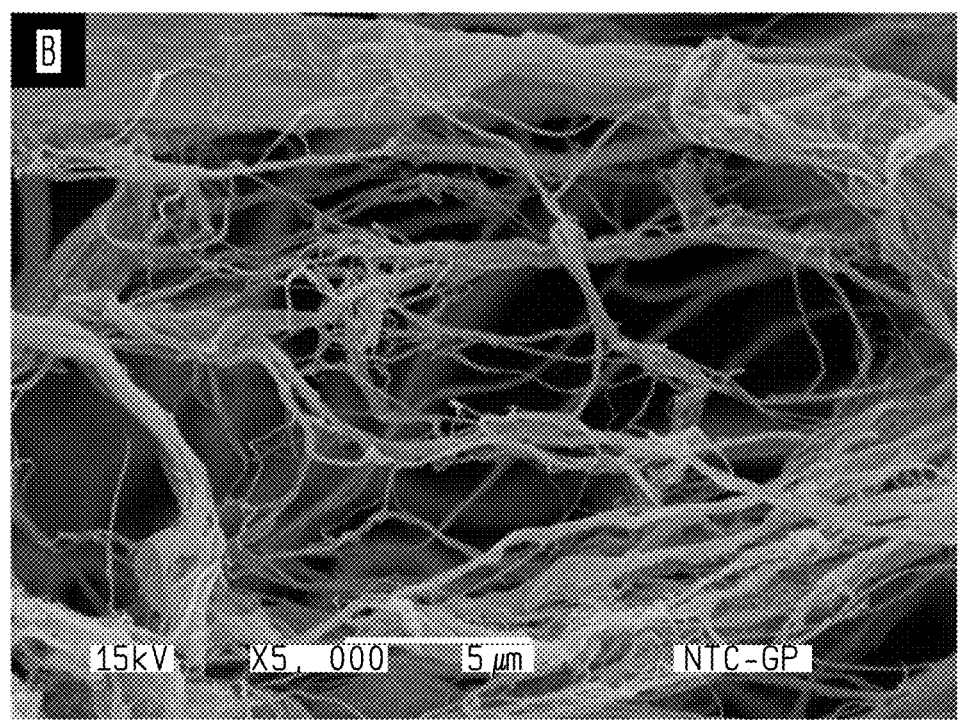

NFC structure is shown in the electron microscope images of FIGS. 10A and 10B.

Viscosity Analysis of NFC

Aqueous NFC suspensions were prepared to obtain 1% consistency. The suspensions were then characterized for their viscosity profiles using the test method and apparatus described above. Results appear in Table 8.

TABLE 8

| NFC Viscosity Profiles | | | |
|---|---|---|---|
| NFC I Shear rate, 1/s | NFC I Viscosity, cP | NFC II Shear rate, 1/s | NFC II Viscosity, cP |
| 0.50 | 523000 | 0.50 | 47567 |
| 0.79 | 366000 | 0.79 | 30257 |
| 1.26 | 237000 | 1.26 | 20859 |
| 1.99 | 144000 | 1.99 | 18659 |
| 3.15 | 108000 | 3.15 | 20987 |
| 5.00 | 80400 | 5.00 | 33392 |
| 7.92 | 93300 | 7.92 | 50742 |
| 12.60 | 54100 | 12.56 | 51553 |

TABLE 8-continued

| NFC Viscosity Profiles | | | |
|---|---|---|---|
| NFC I Shear rate, 1/s | NFC I Viscosity, cP | NFC II Shear rate, 1/s | NFC II Viscosity, cP |
| 19.90 | 72000 | 19.90 | 53050 |
| 31.50 | 53200 | 31.55 | 46992 |
| 50.00 | 21900 | 50.00 | 17078 |
| 79.20 | 14100 | 79.24 | 9200 |
| 126.00 | 5670 | 125.59 | 9716 |
| 199.00 | 2640 | 199.05 | 5741 |
| 315.00 | 1190 | 315.48 | 3053 |
| 500.00 | 553 | 500.00 | 1381 |
| 792.00 | 234 | 792.44 | 674 |
| 1260.00 | 100 | 1255.94 | 308 |
| 1990.00 | 45.8 | 1990.54 | 124 |
| 2000.00 | 30.8 | 2000.00 | 111 |

Figure 11:
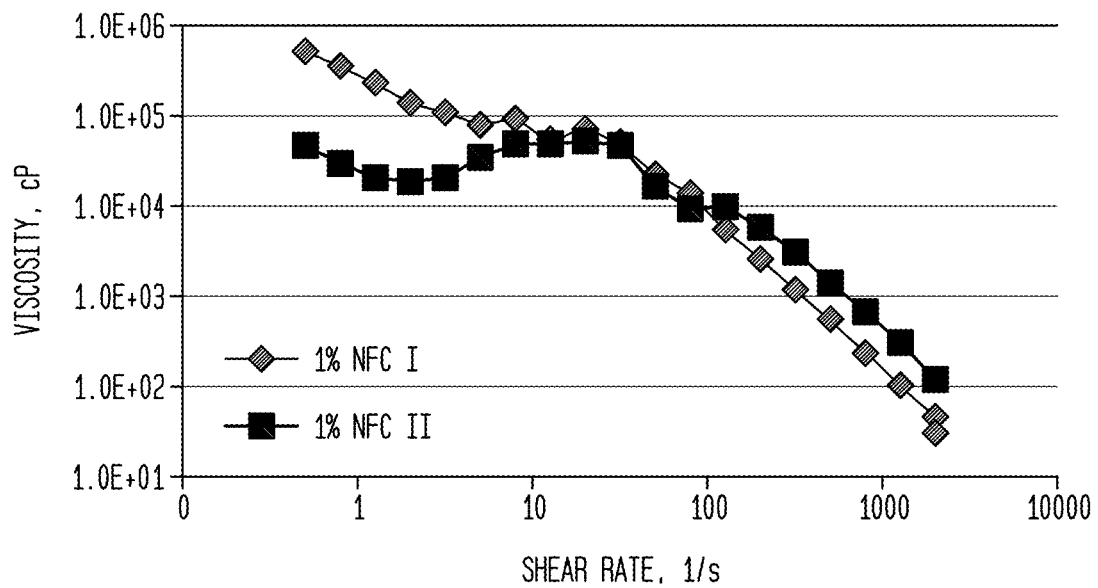
FIG. 11 is a plot of Cellulose Nanofiber Viscosity versus shear rate for NFC I and NFC II.

The data from Table 8 is shown graphically in FIG. 11. It is appreciated from FIG. 11 that NFC is a pseudoplastic material and the properties of NFC I and NFC II are substantially identical.

NFC Breaking Length and Stretch

Figure 12:
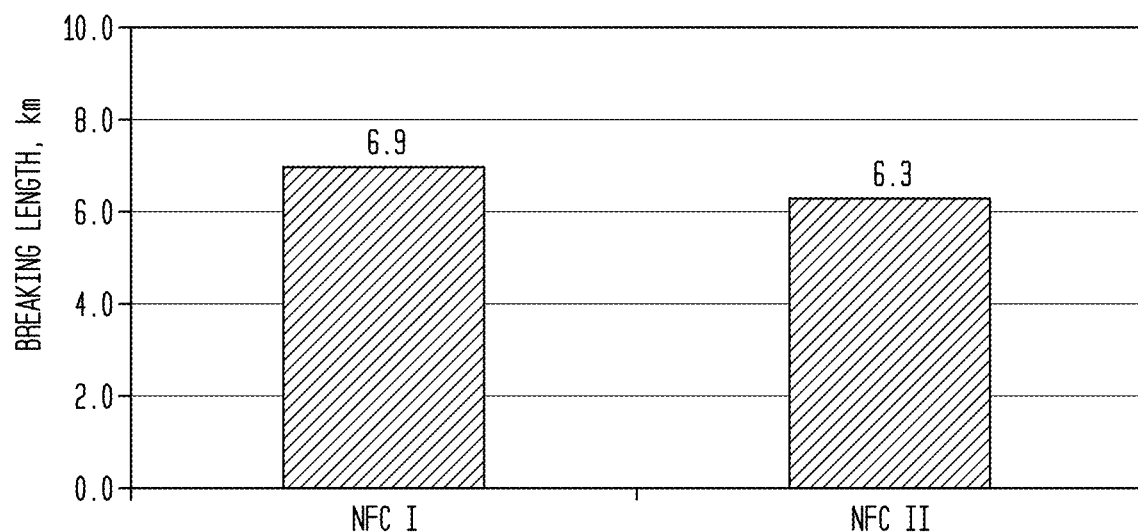
FIG. 12 is a histogram detailing breaking length for NFC I and NFC II formed into handsheets or films.
Figure 13:
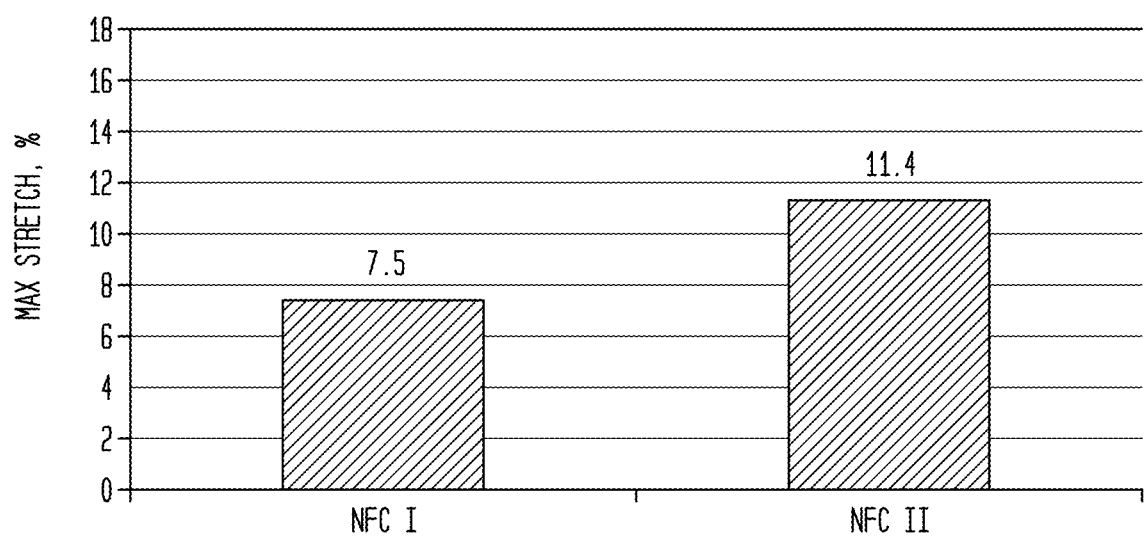
FIG. 13 is a histogram detailing maximum stretch, or stretch at break for NFC I and NFC II, formed into handsheets or film.

100% NFC films or handsheets were formed by vacuum filtration using nylon membrane with 0.45 μm pore size utilizing the NFC I and NFC II materials. Fully restrained drying of NFC films was conducted by attachment of one side of the film to a metal plate and the other side was pressed by a customized perforated ring with a piece of heavy metal on top. The diameter of dried NFC films was 1.5 in. Each film was cut into a 15 mm×1 in strip for tensile testing which provided the information to calculate the breaking length and maximum stretch at break. Results appear in Table 9, as well as in FIGS. 12 and 13.

TABLE 9

| NFC Properties | | |
|---|---|---|
| Sample | Breaking length, km | Max stretch, % |
| NFC I | 6.9 | 7.5 |
| NFC II | 6.3 | 11.4 |

Viscosity Modifiers

As will be appreciated from the foregoing, NFC has a very high viscosity even at 1% consistency. This is due to the large surface area and hydrogen bonds between the nano fibrils. The NFC slurry tends to agglomerate and form uneven spots. Such viscous slurry is not generally suitable to use directly as a bonding agent due to transfer issues to the sheet. A viscosity modifier is needed to evenly disperse the NFC particles and substantially reduce its viscosity with the increase of shear rate. Ideally, the agglomerated nano cellulose fibrils are separated from each other and a new interface, between an inner surface of the liquid dispersion medium and the surface of the particles to be dispersed, is generated. A median to disperse NFC is expected to have high viscosity, but not necessarily to be the same as the viscosity of NFC. Mixing the viscosity modifier and NFC slurry will have a synergistic effect to suspend NFC. Since NFC slurry has a shear-thinning property, the viscosity modifier is expected to have consistent properties to prevent phase separation. Preferred viscosity modifiers include xanthan gum, carboxymethylcellulose (CMC) and to a lesser extent pectin. The viscosity modifiers can be used to formulate effective aqueous adhesives, even with relatively small amounts of NFC as is appreciated from the bond strength results seen above.

Xanthan gum (sometimes referred to herein as XG) is a nature-derived, high-molecular weight polysaccharide produced by the microorganism *Xanthomonas campestris* through microbial fermentation having the structure shown below. Xanthan gum is highly versatile in personal care applications as it is resistant to enzymatic degradation, extremely stable over a wide range of temperatures and pH. Xanthan gum is primarily used as a thickener, but is also a stabilizer for suspensions, emulsions, foams and solid particles in water-based formulations. The xanthan gum used in this study was purchased from Sigma-Aldrich (Xanthan gum from *Xanthomonas campestris*, G1253-500G).

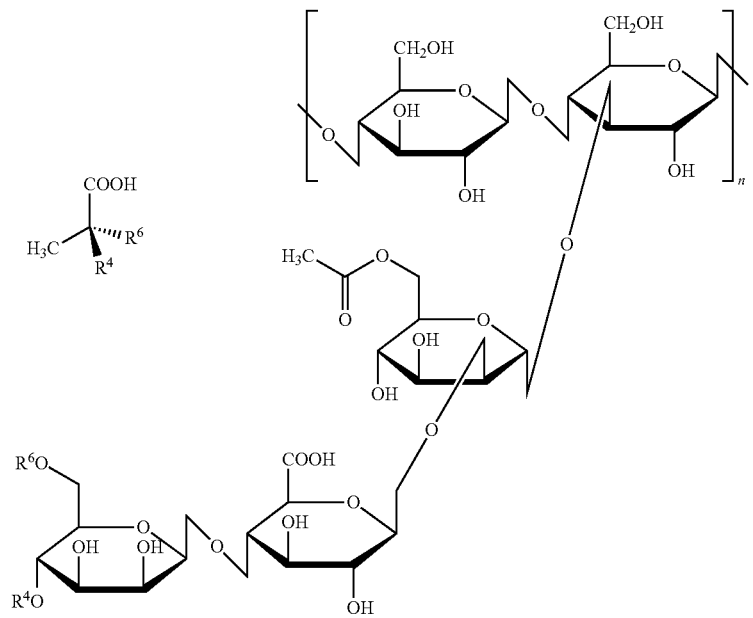

Typically, xanthan gum's molecular weight distribution ranges from $2 \times 10^6$ to $20 \times 10^6$ Da (1 Da=1 g/mol). This molecular weight distribution depends on the association between chains, forming aggregates of several individual chains. The variations of the fermentation conditions used in production are factors that can influence the molecular weight of xanthan gum. See Garcia-Ochoa, F., et al. (2000), "Xanthan gum production, recovery, and properties." *Biotechnology Advances* 18: 549-579.

A suitable carboxymethylcellulose (CMC) is CMC-7MT which is a technical grade of sodium carboxymethylcellulose manufactured by Hercules. It has a degree of substitution of about 0.7, a polymerization degree of 1000, and a molecular weight of 250,000 g/mol.

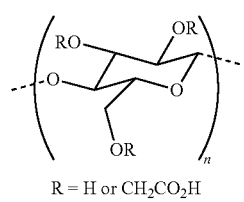

R = H or $CH_2CO_2H$

Pectin, sometimes referred to as poly-D-galacturonic acid methyl ester, is available from Sigma-Aldrich (Pectin from Apple, 76282). Its molecular weight is 30,000 to 100,000 g/mol.

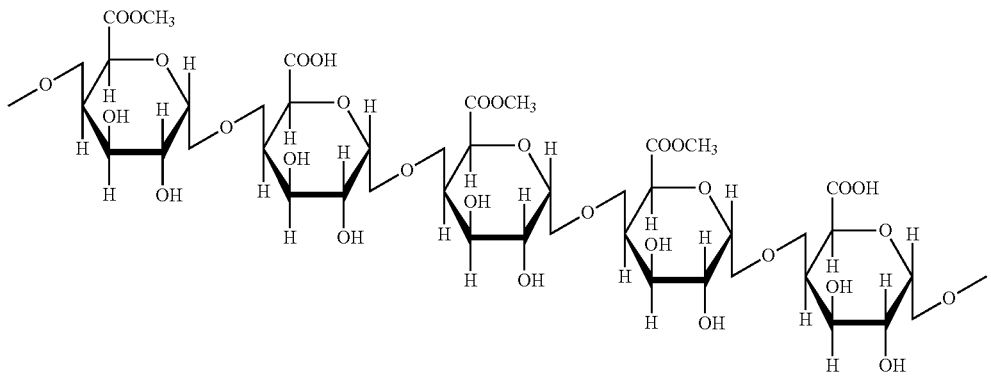

In addition to xanthan gum and CMC and Pectin, other suitable viscosity modifiers may include other polysaccharides (starches, vegetable gums), other natural gums or proteins such as collagen, furcellaran, gelatin and various synthetic polymers depending on solids content of the composition and ratio of NFC/viscosity modifier. Noted are the following viscosity modifiers which may be employed:
- methylcellulose, ethylcellulose, hydroxyethylcellulose, carboxy ethylcellulose, natural resins, natural rosins, and the like;
- starches including corn starch; potato starch; arrowroot; and the like;
- ethoxylated linear alcohols;
- polyethylene glycols, polypropylene glycols, and the like;
- Natural gums obtained from seaweeds such as Agar, Alginic acid and Sodium alginate, Carrageenan;
- Natural gums obtained from non-marine botanical resources such as Gum arabic from the sap of Acacia trees, Gum ghatti from the sap of *Anogeissus* trees, Gum tragacanth from the sap of *Astragalus* shrubs, Karaya gum from the sap of *Sterculia* trees, Guar gum from guar beans, Locust bean gum from the seeds of the carob tree, Beta-glucan from oat or barley bran, Chicle gum (an older base for chewing gum obtained from the chicle tree), Dammar gum from the sap of Dipterocarpaceae trees, Glucomannan from the konjac plant, Mastic gum (a chewing gum from ancient Greece obtained from the mastic tree), *Psyllium* seed husks from the *Plantago* plant, Spruce gum (a chewing gum of American Indians obtained from spruce trees), Tara gum from the seeds of the tara tree;
- Other Natural gums produced by bacterial fermentation such as Gellan gum;
- and any combination of the foregoing.

PVOH and Surface Tension Modifiers

In embodiments which may also be used for ply-bonding converting it is desirable to use a surface tension modifier so that the adhesive coats applicator and pick-up rolls. PVOH is suitable for this purpose and is likewise suitable as an adhesive component in some compositions.

PVOH for use in connection with the present invention include those obtainable from Sekisui Specialty Chemicals, Houston, Tex. as well as other suppliers and distributors. Commercial polyvinyl alcohol resins are produced by saponifying polyvinyl acetate and include significant levels of vinyl acetate repeat units. The degree of hydrolysis (mol %) indicates the mol % alcohol repeat units in the polyvinyl alcohol, with the remainder being in acetate form. A partially hydrolyzed polyvinyl alcohol may be used and dissolved in water that is from about 70 mole percent to about 90 mole percent hydrolyzed, such as from about 84 mole percent to about 89 mole percent hydrolyzed. Partially hydrolyzed polyvinyl alcohols more rapidly dissolve; however, polyvinyl alcohols that are hydrolyzed to a greater extent may be used. For instance, polyvinyl alcohols may also be used in the process that has a percent hydrolysis (mole %) of greater than 90%. In some cases, the polyvinyl alcohol may be from about 91% to about 99.31% hydrolyzed. The molecular weight of the polyvinyl alcohol used can also vary. A relatively low molecular weight polyvinyl alcohol may be used. For instance, the polyvinyl alcohol may have a viscosity at 4% solids and at 20° C. of less than about 10 cps. For instance, the viscosity of the polyvinyl alcohol at 4% solids and 20° C. can be from about 3.5 cps to about 4.5 cps. In other embodiments, however, higher molecular weight polyvinyl alcohols can be used that have a viscosity at 4% solids and at 20° C. of greater than about 5 cps, such as up to about 75 cps. Generally, polyvinyl alcohol or PVOH resins consist mostly of hydrolyzed polyvinyl acetate repeat units (more than 50 mole %), but may include monomers other than polyvinyl acetate in amounts up to about 10 mole % or so in typical commercial resins. Suitable co-monomers include vinyl co-monomers in general and especially those with carboxylate or sulfonate functionality as is seen in U.S. Pat. No. 7,642,226. Typical commercial polyvinyl alcohols are listed in Table 10, below. Characteristic PVOH Viscosity is measured at 4 wt % solution of the polyvinyl alcohol in water at a temperature of 20° C. Viscosity is expressed in centipoises unless otherwise indicated, abbreviated cps or cP.

TABLE 10

Commercial Polyvinyl Alcohol for Adhesive

| Grade | % Hydrolysis | Viscosity, cps[1] | pH | Volatiles, % Max. | Ash, % Max. |
|---|---|---|---|---|---|
| Super Hydrolyzed | | | | | |
| Selvol 125 | 99.3+ | 28-32 | 5.5-7.5 | 5 | 1.2 |
| Selvol 165 | 99.3+ | 62-72 | 5.5-7.5 | 5 | 1.2 |
| Fully Hydrolyzed | | | | | |
| Selvol 103 | 98.0-98.8 | 3.5-4.5 | 5.0-7.0 | 5 | 1.2 |
| Selvol 107 | 98.0-98.8 | 5.5-6.6 | 5.0-7.0 | 5 | 1.2 |
| Selvol 310 | 98.0-98.8 | 9.0-11.0 | 5.0-7.0 | 5 | 1.2 |
| Selvol 325 | 98.0-98.8 | 28.0-32.0 | 5.0-7.0 | 5 | 1.2 |
| Selvol 350 | 98.0-98.8 | 62-72 | 5.0-7.0 | 5 | 1.2 |
| Intermediate Hydrolyzed | | | | | |
| Selvol 418 | 91.0-93.0 | 14.5-19.5 | 4.5-7.0 | 5 | 0.9 |
| Selvol 425 | 95.5-96.5 | 27-31 | 4.5-6.5 | 5 | 0.9 |
| Partially Hydrolyzed | | | | | |
| Selvol 502 | 87.0-89.0 | 3.0-3.7 | 4.5-6.5 | 5 | 0.9 |
| Selvol 203 | 87.0-89.0 | 3.5-4.5 | 4.5-6.5 | 5 | 0.9 |
| Selvol 205 | 87.0-89.0 | 5.2-6.2 | 4.5-6.5 | 5 | 0.7 |
| Selvol 513 | 86.0-89.0 | 13-15 | 4.5-6.5 | 5 | 0.7 |
| Selvol 523 | 87.0-89.0 | 23-27 | 4.0-6.0 | 5 | 0.5 |
| Selvol 540 | 87.0-89.0 | 45-55 | 4.0-6.0 | 5 | 0.5 |

[1] 4% aqueous solution, 20° C.

Commercial formulations containing PVOH are available from a variety of sources including H. B. Fuller of Minnesota. Such compositions may contain optional additives if so desired. See U.S. Pat. No. 7,201,815.

A surface tension analysis was conducted using a SITA pro line t15 tensiometer to characterize various adhesives. As shown in FIG. 14A, at the room temperature, tap water has a surface tension of 72 mN/m. Adding 0.1% xanthan gum into water did not change the surface tension significantly. Mixing 0.5% NFC into the tap water slightly increased the surface tension to 73 mN/m. However, when the 0.5% NFC and 0.1% xanthan were mixed together, the surface tension increased to 93 mN/m. This dramatic change is additional evidence to indicate that the xanthan gum improved the NFC suspension and distribution in aqueous solution.

As a comparison (FIG. 14B), the surface tension of regular PVOH glue (2% PVOH) was below 50 mN/m after 0.6 sec, significantly less than water. By adding 2% PVOH into the NFC bonding agent, the surface tension of CH1 (2% PVOH+0.5% NFC) and CH2 (2% PVOH+0.5% NFC+0.1% xanthan gum) were effectively reduced.

Figure 14B:
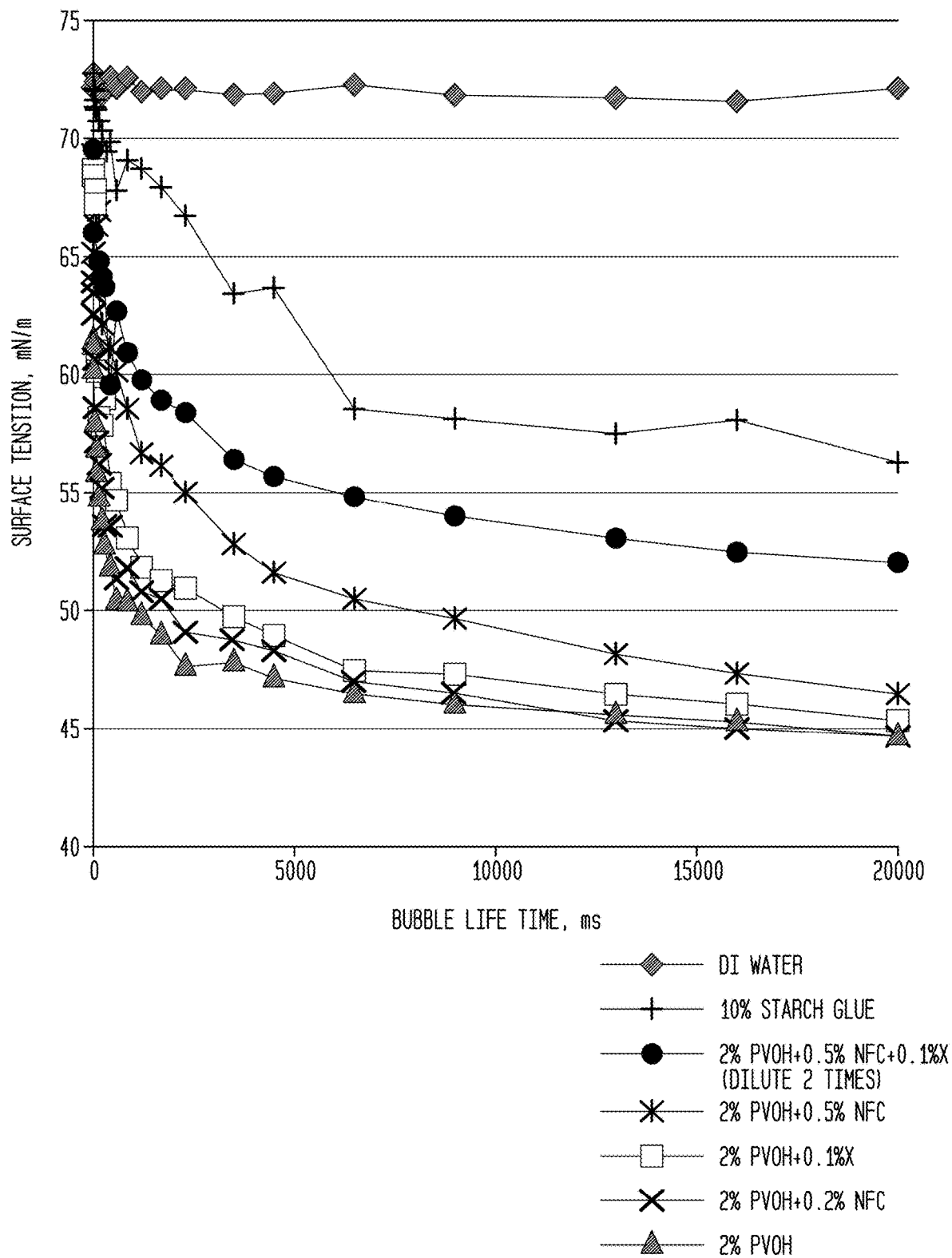
FIG. 14B is a plot showing the surface tension of various compositions.

In FIGS. 14A and 14B the dynamic surface tension of NFC bonding agent along with other liquid is measured at room temperature, using the SITA pro line t15 tensiometer as noted above. The device is based on the bubble pressure method whereby air is pumped through a capillary into the to-be-analyzed liquid. According to the Young-Laplace equation, the pressure difference, $P_{max}-P_{min}$, seen within the bubble's lifetime is proportional to the surface tension.

The sample temperature is equilibrated to room temperature before testing. The capillary of the tensiometer is sunk vertically into the liquid to be measured until the liquid is within the grey marking on the temperature sensor. "Auto mode" was used to measure the dynamic surface tension in the range of bubble lifetimes. For comparison purposes throughout the specification and claims, a surface tension of tested sample at bubble life time 5 seconds is used to characterize materials.

As a result of their adsorption at the surface or interface, surface tension modifiers bring about a reduction in the dynamic surface tension. Immediately after the surface is produced, the dynamic surface tension has the same value as the pure liquid. The value then reduces until an equilibrium value is reached. The time required for this depends on the diffusion rate and the adsorption rate of the surface tension modifier. Interfaces are produced extremely quickly in processes such as spraying, foaming, cleaning, printing, emulsifying or coating. In such processes it is not just the equilibrium value of the surface tension that is the decisive influence, but also the kinetics of the interface formation. The molecular mobility of the surface tension modifier used becomes an important factor in the formation of the dynamic surface tension. An ideal surface tension modifier is expected to effectively reduce the surface tension of NFC bonding agent within a few seconds of bubble lifetime.

Additional surface tension modifiers include surfactants in general such as anionic surfactants, cationic surfactants, zwitterionic surfactants and more preferably nonionic surfactants. One preferred nonionic surfactant is Tergitol® MIN FOAM 1× available from Sigma-Aldrich. This material is a polyglycol ether nonionic surfactant of the formula:

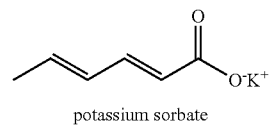

where m and n are integers.

Other suitable surface tension modifiers include $C_{12}$-$C_{18}$-alkyl polyethylene glycol-polypropylene glycol ethers having in each case up to 8 mol of ethylene oxide and propylene oxide units in the molecule. It is also possible to use other known surfactants, for example $C_{12}$-$C_{18}$-alkyl polyethylene glycol-polybutylene glycol ethers having in each case up to 8 mol of ethylene oxide and butylene oxide units in the molecule, end group-capped alkyl polyalkylene glycol mixed ethers, or $C_8$-$C_{14}$-alkyl polyglucosides with a degree of polymerization of about 1 to 4 and/or $C_{12}$-$C_{18}$-alkyl polyethylene glycols with 3 to 8 ethylene oxide units in the molecule. Likewise suitable are surfactants from the family of the glucamides, for example alkyl N-methylglucamides in which the alkyl moiety preferably originates from a fatty alcohol with the carbon chain length $C_6$-$C_{14}$. It is advantageous in some cases when the surfactants described are used as mixtures, for example the combination of alkyl polyglycoside with fatty alcohol ethoxylates or of glucamide with alkyl polyglycosides. The presence of amine oxides, betanes and ethoxylated alkylamines is also possible.

Antimicrobial Agents

Adhesives used in connection with the invention suitably include antimicrobial agents, most preferably food-grade preservatives which function as antibacterial agents and antifungal agents. Without the addition of antimicrobial agent, all the NFC-xanthan gum laminating agents became moldy after two weeks at room temperature in a sealed centrifuge tube. The addition of a trace amount of potassium sorbate was found effective to inhibit the growth of microorganism in NFC adhesive. Potassium sorbate is the potassium salt of sorbic acid. It is a white salt that is very soluble in water and is primarily used as a food preservative. Sorbate is a lipophilic compound and may permeate the bilipid layer of the bacterial cytoplasmic membrane. Interaction of sorbate with that membrane may result in the interference of membrane-associated cellular functions that inhibit the growth of microbes. The typical culinary usage rates of potassium sorbate are 0.025% to 0.1%. A light dosage of 0.025% potassium sorbate was added into 0.5% and 1% NFC-0.1% xanthan gum laminating agent. No mold has been found in the laminating agent after storing at room temperature for two months. Considering paper towel is a food contact material, potassium sorbate is a preferred antiseptic for use in NFC laminating agent of the present invention.

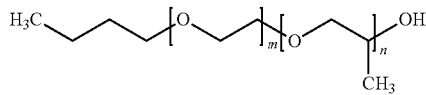

potassium sorbate

Other preferred antimicrobial agents may include other food-grade preservative compositions which include sorbic acid, sodium sorbate, calcium sorbate, benzoic acid, calcium benzoate, potassium benzoate, sodium benzoate, calcium hydrogen sulphite, calcium sulphite, potassium bisulphite, potassium metabisulphite, potassium sulphite, sodium bisulphite, sodium metabisulphite, sodium sulphite, sulphur dioxide, potassium nitrate, potassium nitrite, sodium nitrate, sodium nitrite, calcium propionate, potassium propionate, propionic acid, sodium propionate, mixtures thereof and the like.

Tackifiers

Tackifiers suitable for use in conjunction with the adhesive compositions described herein may, in some embodiments, include, but are not limited to, methylcellulose, ethylcellulose, hydroxyethylcellulose, carboxy methylcellulose, carboxy ethylcellulose, amides, diamines, polyesters, polycarbonates, silyl-modified polyamide compounds, polycarbamates, urethanes, natural resins, natural rosins, rosin esters SYLVATAC® RE85 and SYLVALITE® RE100, both esters of tall oil rosin, available from Arizona Chemical, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl(meth)acrylates, acrylamides, N-(dialkyl amino alkyl)

acrylamide, methacrylamides, hydroxy alkyl(meth)acrylates, methacrylic acids, acrylic acids, hydroxyethyl acrylates, ethylene vinyl acetate, vinyl acetate ethylene polymers, aliphatic hydrocarbons, cycloaliphatic hydrocarbons (e.g., EASTOTAC® products, available from Eastman Chemical Co.), aromatic hydrocarbons, aromatically modified aliphatic hydrocarbons, cycloaliphatic hydrocarbons, hydrogenated versions of the foregoing hydrocarbons, terpenes, polyterpenes, modified terpenes (e.g., phenolic modified terpene resins like SYLVARES™ TP96 and SYLVARES™ TP2040, available from Arizona Chemical, and the like, any derivative thereof, and any combination thereof.

PVOH may also be used as a tackifier as well as a surface tension modifier.

In some embodiments, tackifiers suitable for use in conjunction with the adhesive compositions described herein may be food-grade tackifiers. Examples of food-grade tackifiers include, but are not limited to, methylcellulose, ethylcellulose, hydroxyethylcellulose, carboxy methylcellulose, carboxy ethylcellulose, natural resins, natural rosins, and the like, and any combination thereof.

Additional Components

A typical adhesive composition may optionally include additional additives. Additives suitable for use in conjunction with the adhesive compositions described herein may include, but are not limited to, crosslinkers, insolubilizers, fillers, thickeners, water-resistance additives, flame retardants, lubricants, softening agents, pigments, dyes, antioxidants, UV-stabilizers, resins, rosins, waxes, flowing agents, compatibilizers, aromas, and the like, and any combination thereof. Various exemplary additives are seen in United States Patent Application Publication No. US2015/0090156 of Combs et al., noted above.

Adhesive and Bonding Agent Formulations

The inventive tail-seal adhesives may be based on NFC PolymerGC Glue as noted above as well as NFC PVOH and other components as is noted below.

Bonding agent composition may be described in terms of percent solids or other ingredient based on the total weight of the ply bonding composition. A composition described as 1% NFC and 0.1% xanthan gum thus has 1% NFC, 0.1% xanthan gum and the balance of 98.9% water and other optional ingredients. Two bonding agents generally comparable to a control glue at 4.5% PolymerGC Glue solids are a bonding agent 1 comprised of 2% PolymerGC Glue+0.5% NFC, and NFC bonding agent 2 comprised of 2.3% PolymerGC Glue+0.6% NFC+0.1% xanthan gum, for example. Alternatively, PVOH may be substituted for PolymerGC Glue.

It is sometimes convenient to express the amount of NFC in compositions with relatively high levels of PVOH or PolymerGC Glue content in terms of PVOH or PolymerGC Glue, which is particularly convenient for bonding agents with relatively high weight ratios of PVOH or other components/NFC. 3% PVOH glue should be understood as 3 grams of PVOH per 100 grams solution. NFC addition may then be described as a percentage of the PVOH in the formula. Thus, "3% PVOH+5% NFC based on PVOH content" means that the glue has 3 grams PVOH and 3*0.05=0.15 g NFC per 100 grams solution.

Representative compositions may have one or more features enumerated in Tables 1 through 3B, 4, 5, and 11A, 11B, 11C, and 12 through 17 below may consist essentially of the listed components optionally with ranges adopted from another table herein or by omitting a particular feature such as wt % of one component or weight ratios of two components. The various ranges in the tables may be combined or interchanged between compositions as to various ingredients, that is, a general content range as to wt % PVOH content in one table may be matched with a select content range of NFC wt % content in the same or another table in a particular embodiment of the invention, in which case the weight ratios listed in the tables may be inapplicable to the particular embodiment contemplated. For example, a general content range as to wt % PVOH content in Table 11B may be matched with a select content range NFC wt % content in Table 11C. Likewise the wt % ranges in Table 12 for NFC content may be applied to any of the wt % ranges in Tables 11A-11C as to PVOH content in an aqueous composition and the weight ratios re-calculated.

TABLE 11A

Additional PVOH/NFC Compositions Content Ranges

| Component | General | Typical |
|---|---|---|
| PVOH (wt %) | 1%-7.5% | 1.5%-6% |
| NFC (wt %) | 0.005%-3.75% | 0.01%-1.5% |
| Water (wt %) | 90%-99% | 94-98.5% |
| NFC (% based on PVOH) | 0.5%-50% | 1%-25% |
| Weight Ratio NFC/PVOH | 0.0007-3.75 | 0.015-1.5 |
| Other Additives | balance | balance |

TABLE 11B

Additional PVOH based/NFC containing Compositions Content Ranges

| Component | General | Typical | Select |
|---|---|---|---|
| PVOH (wt %) | 2%-7.5% | 2.5%-6% | 3%-5% |
| NFC (wt %) | 0.01%-1.5% | 0.04%-0.75% | 0.1%-0.5% |
| Water (wt %) | 90%-98% | 94-97.5% | 95%-97% |
| NFC (% based on PVOH) | 1%-20% | 1.5%-12.5% | 4%-11% |
| Weight Ratio NFC/PVOH | 0.001-0.75 | 0.007-0.3 | 0.02-0.17 |
| Other Additives | balance | balance | balance |

TABLE 11C

Additional NFC and PVOH containing Bonding Compositions Content Ranges

| Component | General | Typical | Select |
|---|---|---|---|
| PVOH (wt %) | 1%-3% | 1.5%-2.5% | 1.75%-2.5% |
| NFC (wt %) | 0.25%-1% | 0.3%-0.8% | 0.4%-0.75% |
| Viscosity modifier (wt %) | 0-0.2% | 0.0-0.15% | 0.05%-0.15% |
| Water (wt %) | 95%-99% | 95%-99% | 96%-99% |
| NFC (% based on PVOH) | 8%-100% | 12%-53% | 16%-43% |
| Weight Ratio NFC/PVOH | 0.08-1 | 0.1-0.5 | 0.15-0.4 |
| Other Additives | balance | balance | balance |

TABLE 12

Additional NFC/Viscosity Modifier Bonding Compositions Content Ranges

| Component | General | Typical | Select |
|---|---|---|---|
| NFC (wt %) | 0.15%-3% | 0.175%-2% | 0.2%-1% |
| Viscosity modifier (wt %) | 0.02%-0.2% | 0.05%-0.15% | 0.07%-0.13% |

TABLE 12-continued

Additional NFC/Viscosity Modifier Bonding Compositions Content Ranges

| Component | General | Typical | Select |
|---|---|---|---|
| Weight Ratio NFC:Viscosity Modifier | 150-0.75 | 40-1.2 | 14-1.5 |
| Water (wt %) | 95%-99.9% | 97%-99.8% | 98%-99.8% |
| Other Additives | balance | balance | balance |

Compositions with relatively high PVOH content and relatively low NFC content may be formulated from commercial polyvinyl alcohol (PVOH) adhesive and NFC by diluting a commercially available 8% solids by weight aqueous PVOH adhesive and thoroughly mixing with NFC as detailed in Table 12, wherein it is seen Conventional PVOH glue was diluted to 4-6% solid content from commercial PVOH plybond water-based adhesive (WB2746, H. B. Fuller, 8% solids). Two types of NFC were employed in the formulations of Table 12: NFC A, a relatively fine grade in an aqueous dispersion, 3.28% by weight solids; NFC B, a somewhat coarser grade in an aqueous dispersion, 1.92% solids were mixed with the commercial PVOH to prepare NFC reinforced PVOH glues having the composition shown in Table 13.

TABLE 13

Preparation of Glue

| Glue # | Sample | PVOH Solids, % (w/w) | 8% PVOH, g | 3.28% NFC A, g | 1.92% NFC B, g | Water, g | Total, g |
|---|---|---|---|---|---|---|---|
| 1 | PVOH | 4 | 150 | | | 150.00 | 300.00 |
| 2 | | 4.5 | 170 | | | 132.22 | 302.22 |
| 3 | | 5 | 190 | | | 114.00 | 304.00 |
| 4 | | 5.5 | 210 | | | 95.45 | 305.45 |
| 5 | | 6 | 225 | | | 75.00 | 300.00 |
| 6 | PVOH + | 4 | 150 | 18.29 | | 131.71 | 300.00 |
| 7 | 5% NFC | 4.5 | 170 | 20.73 | | 111.49 | 302.22 |
| 8 | A * | 5 | 190 | 23.17 | | 90.83 | 304.00 |
| 9 | | 5.5 | 210 | 25.61 | | 69.84 | 305.45 |
| 10 | | 6 | 225 | 27.44 | | 47.56 | 300.00 |
| 11 | PVOH + | 4 | 150 | | 31.25 | 118.75 | 300.00 |
| 12 | 5% NFC | 4.5 | 170 | | 35.42 | 96.81 | 302.22 |
| 13 | B * | 5 | 190 | | 39.58 | 74.42 | 304.00 |
| 14 | | 5.5 | 210 | | 43.75 | 51.70 | 305.45 |
| 15 | | 6 | 225 | | 46.88 | 28.13 | 300.00 |

* based on PVOH content

PVOH Based Adhesive Viscosity Characteristics

Figure 15:
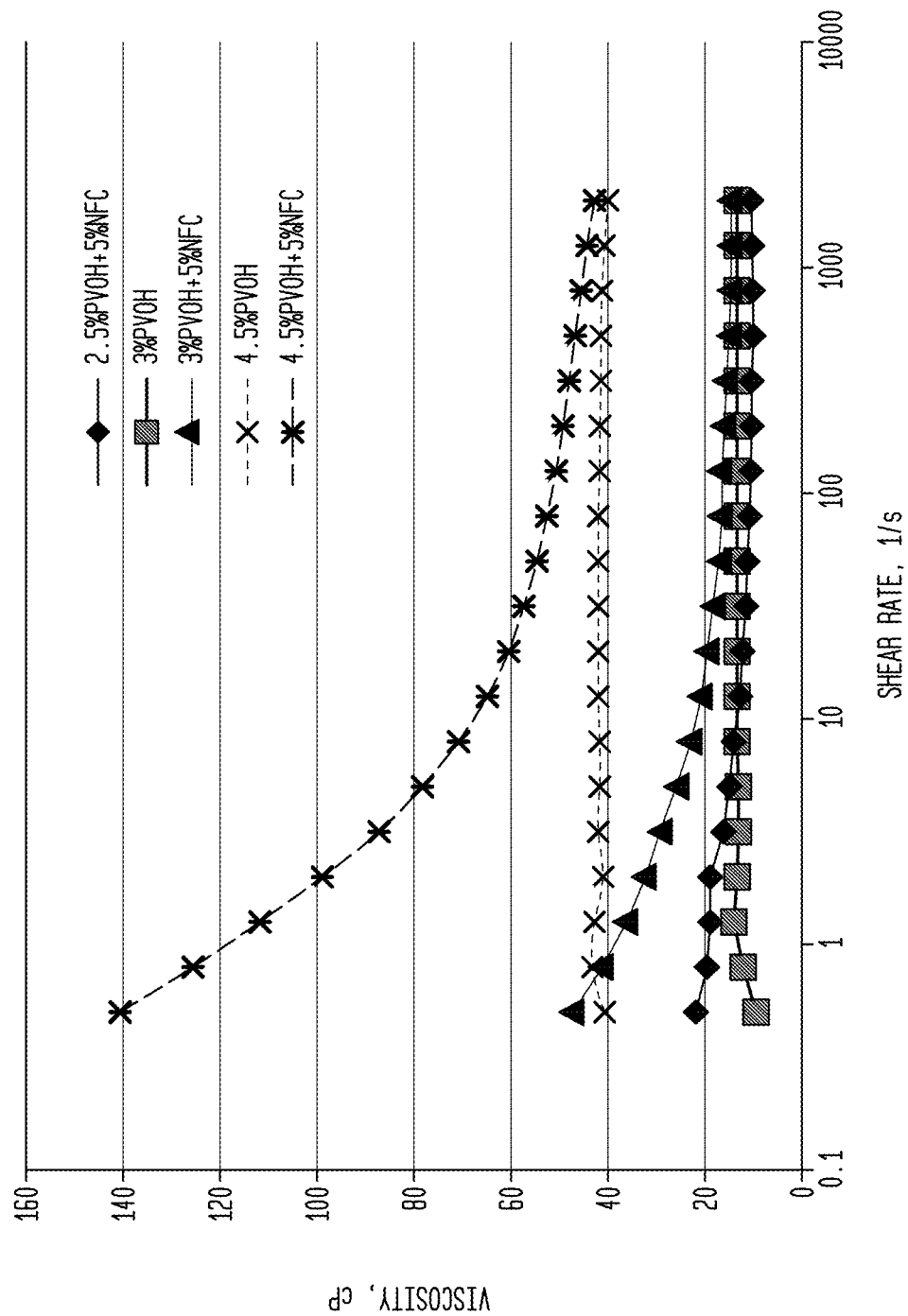
FIGS. 15 and 16 are plots of Adhesive Viscosity versus shear rate for various adhesives.
Figure 16:
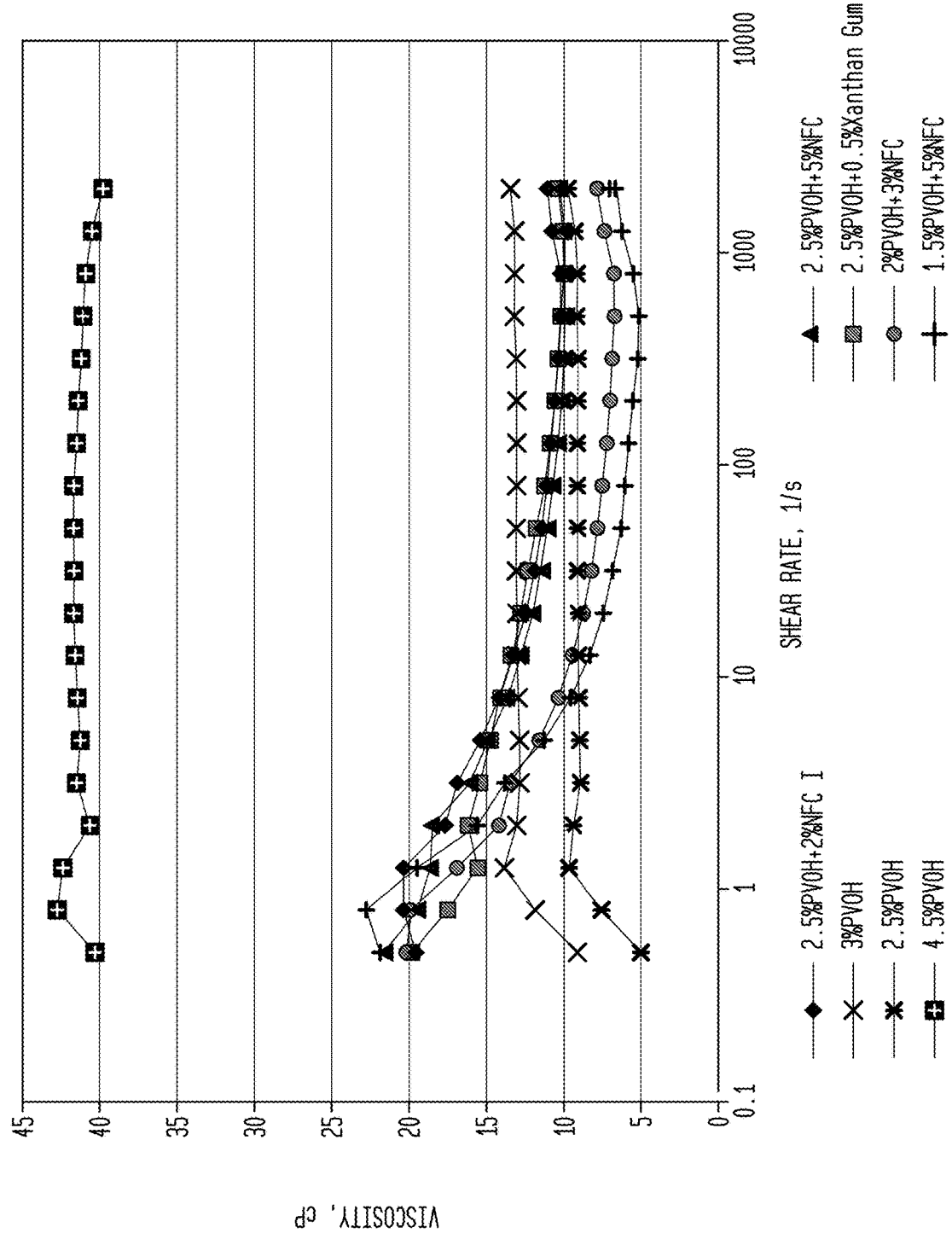

The above and additional glues with different levels of PVOH and NFC were tested for their viscosity with respect to shear rate using the procedure noted above. The viscosity of each glue represented as centiPoise vs. shear rate ($\dot{\gamma}$, which is proportional to rotor speed and inversely related to gap) is shown in FIGS. 15 and 16. All the PVOH glues without NFC were typical Newtonian fluids in which viscosity stays the same regardless of shear rate in the range of 0.5-2000 s$^{-1}$. Viscosity of 4.5% PVOH was over three times the viscosity of 3% PVOH. All the glues that contain 5% NFC based on the dry weight of PVOH displayed a shear thinning property. For the NFC reinforced glues, 3% PVOH+5% NFC and 4.5% PVOH+5% NFC, the incorporation of NFC significantly increased the viscosity of the glue and the degree of increase depends on the shear rate. Two glue samples, 3% PVOH and 2.5% PVOH+5% NFC, had very similar viscosity curves. Therefore, it is likely that a similar volume of glue will be applied on base web when using these two types of glue. However, 2.5% PVOH+5% NFC provides a benefit in terms of softness since less total PVOH is used.

FIGS. 15, 16 likewise show that standard PVOH glue is converted from a Newtonian fluid to a pseudoplastic (shear-thinning) fluid by addition of a small quantity of NFC. Low-shear viscosity is also significantly increased. Glue containing 2.5% PVOH with NFC has a viscosity in a similar range as 3% PVOH. If the fluid dynamics of each glue results in the transfer of a similar liquid volume, it is reasonable to assume that the NFC glue supplied about 20% less PVOH (2.5/3). Softness is improved due to the smaller amount of glue being less detectable to touch. The glue/tissue interface between the applicator roll and emboss roll may involve the most important transfer of glue, and the shear rate becomes an important consideration for non-Newtonian fluids. If the shear rate is low, the alternative glues will have higher viscosity than 3% PVOH. If the shear rate is above about 10 sec$^{-1}$, the alternative glues will be thinner. Given that the roll speeds are matched and the nip pressure is low, the shear rate is expected to be low. Thus, the alternative glues are hypothesized to act as higher viscosity glues in terms of wet tack while delivering a smaller quantity of dry residual.

NFC Bonding Agent Viscosity Characteristics

Suitable bonding agents based on NFC and viscosity modifiers and optionally other components are prepared in dilute aqueous solution or suspension by mixing under shear, typically with an NFC content of 1% by weight or so with viscosity modifier and other optional components. Representative aqueous compositions are enumerated in Table 14 wherein the composition component content is reported in % by weight of the total composition, of which the balance is water (98%+) in most cases. When the adhesive is also intended for use in converting operations with an applicator roll, especially a rubber roll, a surface tension modifier is included as noted above. The data is tabulated in Table 14 and shown FIGS. 17-20.

TABLE 14

| Viscosity Properties | | | | | | | | | |
|---|---|---|---|---|---|---|---|---|---|
| 0.5% NFC + 0.1% Xanthan Gum | | 0.5% NFC + 0.07% Xanthan Gum | | 0.75% NFC + 0.1% Xanthan Gum | | 1.0% NFC + 0.1% Xanthan Gum | | 1.0% NFC + 0.13% Xanthan Gum | |
| Shear rate 1/s | Viscosity cP | Shear rate 1/s | Viscosity cP | Shear rate 1/s | Viscosity cP | Shear rate 1/s | Viscosity cP | Shear rate 1/s | Viscosity cP |
| 0.50 | 2285.51 | 0.50 | 1972.57 | 0.50 | 4224.78 | 0.50 | 7165.04 | 0.50 | 7934.89 |
| 0.79 | 1575.43 | 0.79 | 1309.78 | 0.79 | 2820.21 | 0.79 | 4966.77 | 0.79 | 5316.51 |
| 1.26 | 1043.28 | 1.26 | 874.30 | 1.26 | 1869.05 | 1.26 | 3322.62 | 1.26 | 3582.18 |
| 1.99 | 704.23 | 1.99 | 587.04 | 1.99 | 1227.38 | 1.99 | 2235.63 | 1.99 | 2426.69 |
| 3.15 | 478.15 | 3.15 | 405.18 | 3.15 | 801.51 | 3.15 | 1504.34 | 3.15 | 1666.15 |
| 5.00 | 333.09 | 5.00 | 285.76 | 5.00 | 568.07 | 5.00 | 1032.28 | 5.00 | 1232.16 |
| 7.92 | 205.50 | 7.92 | 205.12 | 7.92 | 427.17 | 7.92 | 713.33 | 7.92 | 856.73 |

TABLE 14-continued

Viscosity Properties

| | | | | | | | | | |
|---|---|---|---|---|---|---|---|---|---|
| 12.56 | 139.35 | 12.56 | 156.35 | 12.56 | 293.15 | 12.56 | 508.80 | 12.56 | 581.95 |
| 19.91 | 112.90 | 19.91 | 263.69 | 19.91 | 216.41 | 19.91 | 395.89 | 19.91 | 414.02 |
| 31.55 | 77.61 | 31.55 | 315.89 | 31.55 | 149.16 | 31.55 | 381.45 | 31.55 | 303.68 |
| 50.00 | 56.27 | 50.00 | 857.91 | 50.00 | 101.08 | 50.00 | 273.30 | 50.00 | 171.76 |
| 79.24 | 40.55 | 79.25 | 484.10 | 79.24 | 79.23 | 79.24 | 273.26 | 79.24 | 132.78 |
| 125.59 | 27.96 | 125.59 | 251.89 | 125.59 | 62.87 | 125.59 | 248.12 | 125.59 | 97.72 |
| 199.05 | 23.66 | 199.06 | 126.79 | 199.05 | 74.96 | 199.05 | 139.44 | 199.05 | 75.55 |
| 315.48 | 19.10 | 315.478 | 68.06 | 315.48 | 65.16 | 315.48 | 94.73 | 315.48 | 53.36 |
| 500.00 | 15.07 | 500.00 | 42.41 | 500.00 | 38.42 | 500.00 | 51.36 | 500.00 | 35.85 |
| 792.45 | 11.95 | 792.45 | 26.29 | 792.45 | 25.76 | 792.45 | 35.80 | 792.45 | 26.27 |
| 1255.95 | 8.89 | 1255.94 | 17.51 | 1255.94 | 23.22 | 1255.94 | 25.75 | 1255.94 | 20.36 |
| 1990.54 | 7.37 | 1990.53 | 12.09 | 1990.54 | 15.91 | 1990.54 | 18.91 | 1990.53 | 16.71 |
| 2000.00 | 7.36 | 2000.00 | 12.17 | 2000.00 | 15.62 | 2000.00 | 16.52 | 2000.00 | 16.88 |

| 1.0% NFC Slurry_Paperlogic | | 1.0% Xanthan Gum | | 5% PVOH_TT3005 | | 2.5% PVOH_TT3005 | | 4.5% PVOH | |
|---|---|---|---|---|---|---|---|---|---|
| Shear rate 1/s | Viscosity cP | Shear rate 1/s | Viscosity cP | Shear rate 1/s | Viscosity cP | Shear rate 1/s | Viscosity cP | Shear rate 1/s | Viscosity cP |
| 0.50 | 47567.1 | 0.50 | 16684 | 0.50 | 61.04 | 0.50 | 6.44 | 0.50 | 38.43 |
| 0.79 | 30257 | 0.79 | 12759.8 | 0.79 | 58.83 | 0.79 | 7.00 | 0.79 | 41.30 |
| 1.26 | 20858.7 | 1.26 | 8829.06 | 1.26 | 59.01 | 1.26 | 7.28 | 1.26 | 42.02 |
| 1.99 | 18659.4 | 1.99 | 5897.01 | 1.99 | 60.85 | 1.99 | 7.03 | 1.99 | 40.17 |
| 3.15 | 20986.7 | 3.15 | 3868.86 | 3.15 | 60.30 | 3.15 | 7.10 | 3.15 | 40.83 |
| 4.50 | 33391.9 | 4.50 | 2501.74 | 5.00 | 60.71 | 5.00 | 7.03 | 5.00 | 40.68 |
| 7.92 | 50741.6 | 7.92 | 1609.89 | 7.92 | 60.86 | 7.92 | 7.04 | 7.92 | 40.82 |
| 12.56 | 51552.9 | 12.56 | 1040.07 | 12.56 | 60.96 | 12.56 | 7.06 | 12.56 | 40.99 |
| 19.90 | 53049.5 | 19.91 | 676.49 | 19.91 | 61.12 | 19.91 | 7.07 | 19.91 | 41.08 |
| 31.55 | 46991.5 | 31.55 | 441.97 | 31.55 | 61.23 | 31.55 | 7.09 | 31.55 | 41.18 |
| 50.00 | 17077.7 | 50 | 292.58 | 50 | 61.24 | 50 | 7.09 | 50 | 41.22 |
| 79.24 | 9200.18 | 79.24 | 195.90 | 79.24 | 61.08 | 79.24 | 7.08 | 79.24 | 41.21 |
| 125.59 | 9716.41 | 125.59 | 132.61 | 125.59 | 60.58 | 125.59 | 7.06 | 125.59 | 41.12 |
| 199.05 | 5740.54 | 199.05 | 91.19 | 199.05 | 59.95 | 199.05 | 7.06 | 199.05 | 40.95 |
| 315.48 | 3052.84 | 315.48 | 63.50 | 315.48 | 59.41 | 315.48 | 7.07 | 315.48 | 40.76 |
| 500.00 | 1381.11 | 500 | 45.08 | 500 | 58.94 | 500.00 | 7.08 | 500 | 40.66 |
| 792.44 | 673.67 | 792.446 | 32.49 | 792.45 | 58.37 | 792.45 | 7.15 | 792.45 | 40.51 |
| 1255.94 | 307.66 | 1255.94 | 23.91 | 1255.94 | 57.48 | 1255.94 | 7.40 | 1255.94 | 40.15 |
| 1990.54 | 123.97 | 1990.54 | 18.13 | 1990.54 | 55.82 | 1990.54 | 8.04 | 1990.54 | 39.46 |
| 2000 | 111.17 | 2000 | 18.04 | 2000 | 56.04 | 2000 | 8.04 | 2000 | 39.64 |

| 0.5% NFC + 0.1% CMC | | 1% NFC + 0.1% CMC | | 1% CMC | | 0.5% NFC + 0.1% Pectin | | 1% NFC + 0.1% Pectin | |
|---|---|---|---|---|---|---|---|---|---|
| Shear rate 1/s | Viscosity cP | Shear rate 1/s | Viscosity cP | Shear rate 1/s | Viscosity cP | Shear rate 1/s | Viscosity cP | Shear rate 1/s | Viscosity cP |
| 0.50 | 1448.19 | 0.50 | 6509.86 | 0.50 | 29.58 | 0.50 | 2448.86 | 0.50 | 14498.6 |
| 0.79 | 1085.57 | 0.79 | 4470.14 | 0.79 | 9.71 | 0.79 | 1736.49 | 0.79 | 9780.89 |
| 1.26 | 792.46 | 1.26 | 3164.83 | 1.26 | 5.53 | 1.26 | 1344.6 | 1.26 | 6842.66 |
| 1.99 | 507.88 | 1.99 | 2331.13 | 1.99 | 3.54 | 1.99 | 1524.33 | 1.99 | 5595.46 |
| 3.15 | 325.95 | 3.15 | 1852.03 | 3.15 | 3.08 | 3.15 | 1849.64 | 3.15 | 5920.71 |
| 5.00 | 218.70 | 5 | 1369.12 | 5.00 | 2.75 | 5.00 | 1805.29 | 5.00 | 6035.95 |
| 7.92 | 146.73 | 7.92 | 1028.99 | 7.92 | 2.59 | 7.92 | 1992.44 | 7.92 | 5883.83 |
| 12.56 | 105.28 | 12.56 | 764.01 | 12.56 | 2.47 | 12.56 | 2233.02 | 12.56 | 6096.8 |
| 19.9 | 79.38 | 19.91 | 625.82 | 19.91 | 2.39 | 19.91 | 2835.81 | 19.91 | 8231.61 |
| 31.55 | 61.14 | 31.55 | 525.88 | 31.55 | 2.34 | 31.55 | 3109.2 | 31.55 | 10798.3 |
| 50 | 49.79 | 50 | 523.52 | 50 | 2.30 | 50.00 | 2201.81 | 50.00 | 10238.7 |
| 79.24 | 41.42 | 79.25 | 202.46 | 79.24 | 2.26 | 79.24 | 1381.82 | 79.25 | 3706.51 |
| 125.59 | 35.14 | 125.59 | 86.02 | 125.59 | 2.24 | 125.60 | 1339.05 | 125.60 | 541.87 |
| 199.05 | 28.87 | 199.05 | 54.57 | 199.05 | 2.23 | 199.06 | 1394.46 | 199.05 | 50.96 |
| 315.48 | 21.84 | 315.48 | 43.02 | 315.48 | 2.26 | 315.48 | 514.42 | 315.48 | 43.13 |
| 500.00 | 18.31 | 500 | 33.78 | 500 | 2.38 | 500.00 | 208.01 | 500.00 | 29.51 |
| 792.45 | 16.67 | 792.45 | 28.15 | 792.45 | 2.61 | 792.45 | 101.96 | 792.45 | 27.03 |
| 1255.94 | 12.95 | 1255.94 | 23.89 | 1255.94 | 3.04 | 1255.94 | 47.02 | 1255.94 | 26.63 |
| 1990.54 | 9.58 | 1990.54 | 18.98 | 1990.54 | 3.69 | 1990.53 | 24.64 | 1990.53 | 16.57 |
| 2000 | 9.55 | 2000 | 18.80 | 2000 | 3.70 | 2000 | 23.02 | 2000 | 18.42 |

| 1% Pectin | | 2.5% PVOH TT3005 | | 4.5% PVOH | | 1.0% NFC Shiny Paperlogic | |
|---|---|---|---|---|---|---|---|
| Shear rate 1/s | Viscosity cP | Shear rate 1/s | Viscosity cP | Shear rate 1/s | Viscosity cP | Shear rate 1/s | Viscosity cP |
| 0.50 | 40.39 | 0.50 | 6.44 | 0.50 | 38.43 | 0.50 | 47567.1 |
| 0.79 | 39.15 | 0.79 | 7.00 | 0.79 | 41.30 | 0.79 | 30257 |
| 1.26 | 38.07 | 1.26 | 7.28 | 1.26 | 42.02 | 1.26 | 20858.7 |
| 1.99 | 36.15 | 1.99 | 7.03 | 1.99 | 40.17 | 1.99 | 18659.4 |
| 3.15 | 33.87 | 3.15 | 7.10 | 3.15 | 40.83 | 3.15 | 20986.7 |
| 5.00 | 33.00 | 5.00 | 7.03 | 5.00 | 40.68 | 5.00 | 33391.9 |

TABLE 14-continued

| | Viscosity Properties |
|---|---|---|---|---|---|---|---|
| 7.92 | 32.38 | 7.921 | 7.04 | 7.92 | 40.82 | 7.92 | 50741.6 |
| 12.56 | 31.83 | 12.56 | 7.06 | 12.56 | 40.99 | 12.56 | 51552.9 |
| 19.91 | 31.27 | 19.91 | 7.07 | 19.91 | 41.08 | 19.90 | 53049.5 |
| 31.55 | 30.79 | 31.55 | 7.09 | 31.55 | 41.18 | 31.55 | 46991.5 |
| 50 | 30.36 | 50 | 7.09 | 50 | 41.22 | 50.00 | 17077.7 |
| 79.24 | 29.90 | 79.24 | 7.08 | 79.24 | 41.21 | 79.24 | 9200.18 |
| 125.59 | 29.41 | 125.59 | 7.06 | 125.59 | 41.12 | 125.59 | 9716.41 |
| 199.05 | 28.80 | 199.05 | 7.06 | 199.05 | 40.95 | 199.05 | 5740.54 |
| 315.48 | 27.93 | 315.48 | 7.07 | 315.48 | 40.76 | 315.48 | 3052.84 |
| 500 | 26.81 | 500.00 | 7.08 | 500 | 40.66 | 500.00 | 1381.11 |
| 792.45 | 25.35 | 792.45 | 7.15 | 792.4 | 40.51 | 792.44 | 673.67 |
| 1255.94 | 23.54 | 1255.94 | 7.40 | 1255.94 | 40.15 | 1255.94 | 307.66 |
| 1990.54 | 21.50 | 1990.54 | 8.04 | 1990.54 | 39.46 | 1990.54 | 123.97 |
| 2000 | 21.46 | 2000 | 8.04 | 2000 | 39.64 | 2000 | 111.17 |

Figure 17:
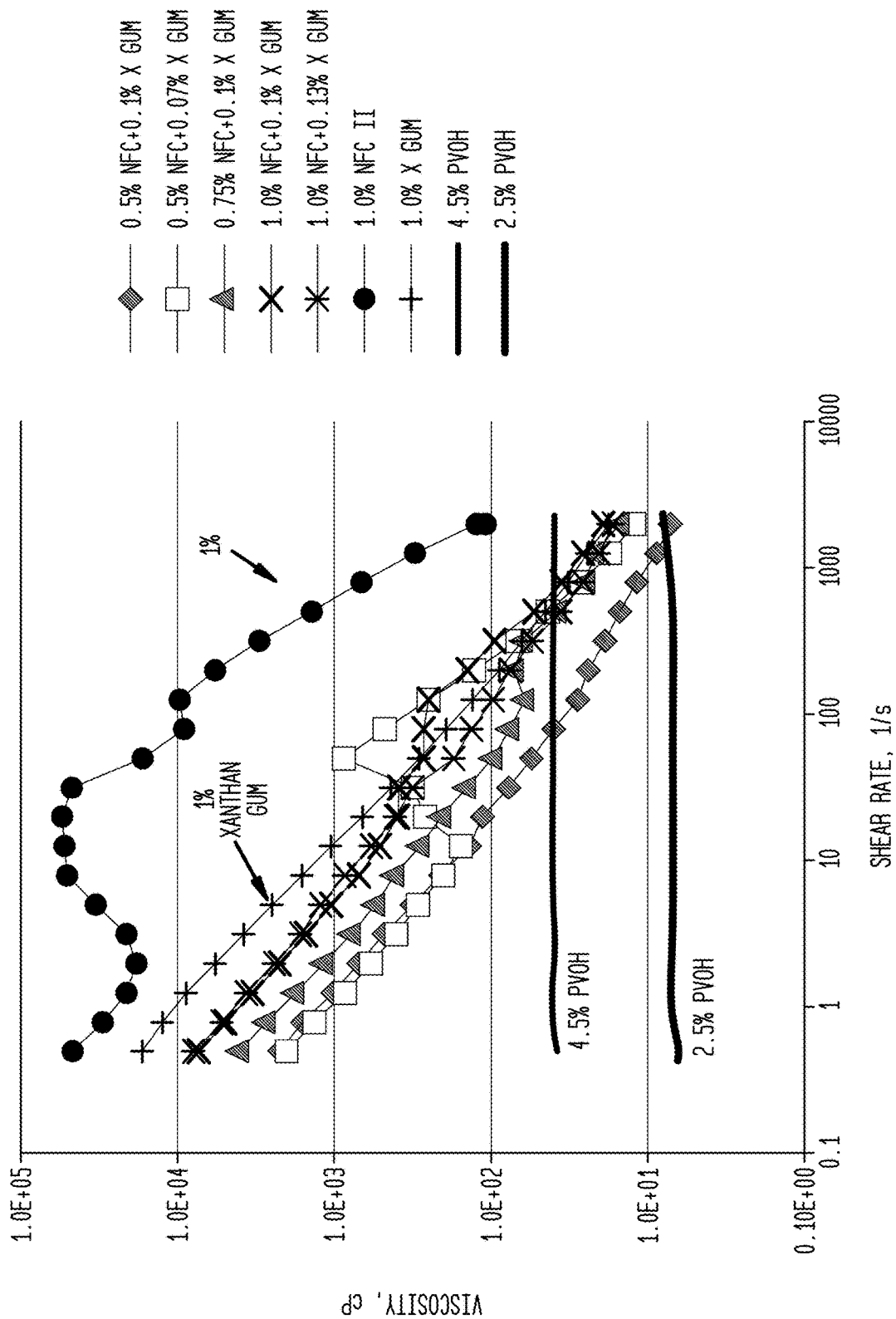
FIGS. 17-20 are plots of Viscosity versus shear rate for various bonding agents and components thereof.
Figure 18:
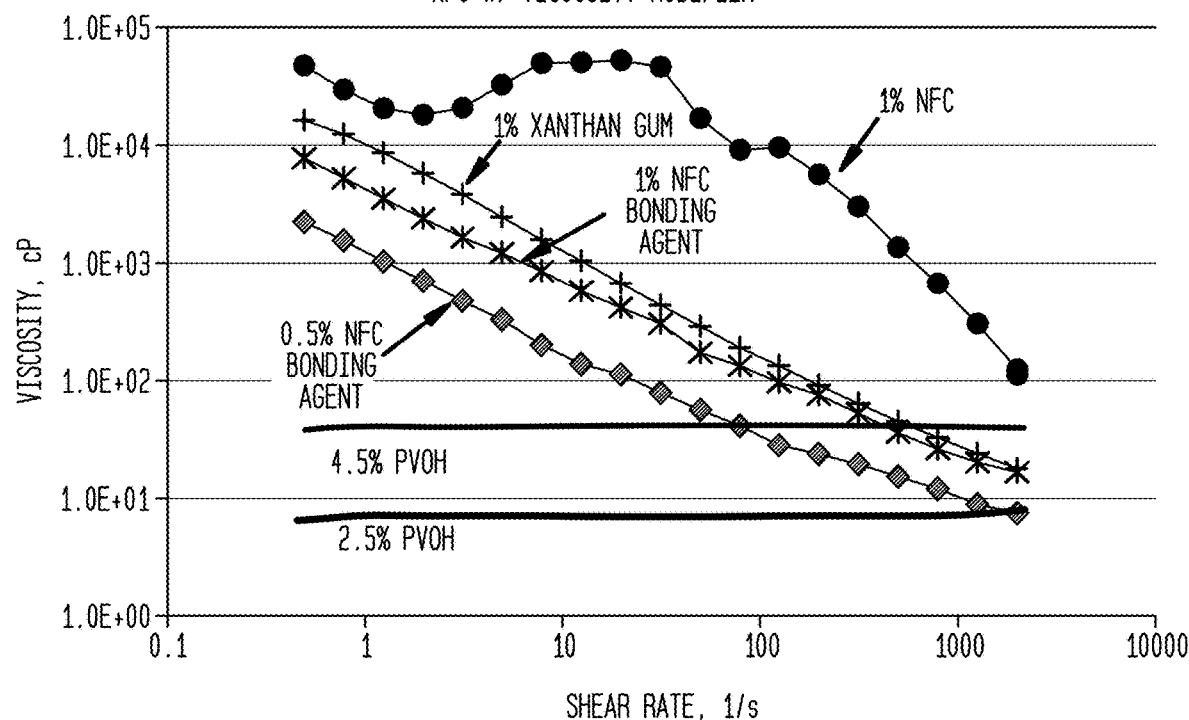

According to viscosity analysis (FIGS. 17-20), both NFC slurry and xanthan gum are pseudoplastic materials and their viscosities are significantly higher than 4.5% PVOH. At the same concentration 1%, xanthan gum has much lower viscosity than NFC. By mixing 0.1% xanthan gum with 1% NFC, the viscosity of 1% NFC+0.1% xanthan gum was significantly decreased and the viscosity appears very similar to 1% xanthan gum. The blend of 1% NFC with 0.13% xanthan gum completely smoothes the viscosity curve and makes the viscosity even lower than 1% xanthan gum. This observation suggested that a tiny amount of xanthan gum was effective in dispersing and suspending NFC to increase its fluidity. A similar trend can also be found for 0.5% NFC with a viscosity reducing amount of xanthan gum. At a commercial converting speed 1000-2000 fpm, the shear rate range is roughly equivalent to between 100 and 2000 s−1, and the viscosity of NFC-xanthan gum laminating agents is in between 2.5% and 4.5% PVOH, which allows the NFC-xanthan gum laminating agents to run at converting line. FIG. 17 also provides information to help determine the optimal ratio of NFC to xanthan gum. For example, 0.07% xanthan gum was found enough to suspend 0.5% NFC. The big jump of viscosity curve beyond 10 s$^{-1}$ shear rate indicated that the amount of xanthan gum is insufficient to overcome the strong friction of NFC particles at high shear rate, and the high viscosity is a risk for a stable run of converting and non-uniform application of laminating agent to the basesheet. Based on the viscosity information, a recommended ratio of NFC to xanthan appears to be in the range of 1:0.13-0.2.

Figure 19:
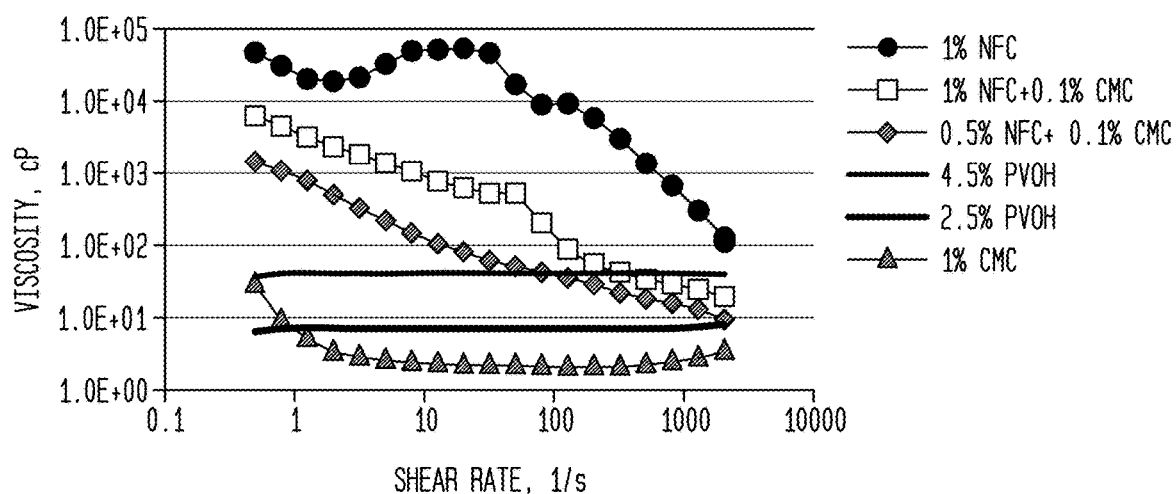
Figure 20:
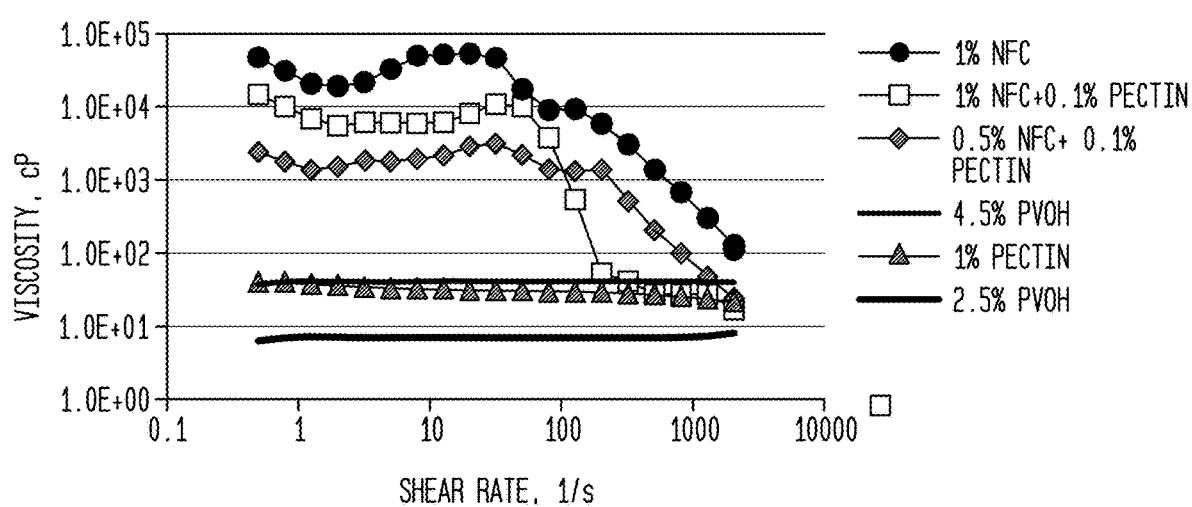

Bonding Agent formulated with CMC and pectin show similar rheological behavior as is seen in FIGS. 19, 20.

It is seen that the viscosity modifiers all have significantly lower viscosities than NFC at similar concentrations.

Representative compositions thus may have one or more features enumerated in Tables 15 through 17 below.

TABLE 15

Representative PVOH based/NFC Adhesives Content Ranges

| Component | Typical | Select |
|---|---|---|
| PVOH (wt %) | 2.5%-6% | 3%-5% |
| NFC (wt %) | 0.1%-0.6% | 0.125%-0.5% |
| Weight Ratio NFC/PVOH | 0.017-0.24 | 0.025-0.17 |
| NFC (% based on PVOH) | 1%-20% | 4%-11% |

TABLE 15-continued

Representative PVOH based/NFC Adhesives Content Ranges

| Component | Typical | Select |
|---|---|---|
| Water (wt %) | >90% | >90% |
| Other Additives | Balance | Balance |

Preferred PVOH based/NFC adhesives include those wherein the adhesive exhibits an Adhesive Viscosity reduction of at least 15% as shear rate is increased from 1 sec$^{-1}$ to 100 sec$^{-1}$; more preferably wherein the adhesive exhibits an Adhesive Viscosity reduction of at least 25% as shear rate is increased from 1 sec$^{-1}$ to 100 sec$^{-1}$; and still more preferably wherein the adhesive exhibits an Adhesive Viscosity reduction of at least 50% as shear rate is increased from 1 sec$^{-1}$ to 100 sec$^{-1}$.

TABLE 16

Representative NFC and PVOH containing Bonding Compositions Content Ranges

| Component | Typical | Select |
|---|---|---|
| PVOH (wt %) | 1%-3% | 1.75%-2.5% |
| NFC (wt %) | 0.25%-1% | 0.4%-0.75% |
| Viscosity modifier (wt %) | 0-0.2% | 0.05%-0.15% |
| NFC (% based on PVOH) | 10%-100% | 15%-45% |
| Weight Ratio NFC/PVOH | 0.08-1 | 0.15-0.4 |
| Weight Ratio NFC/Viscosity modifier | 0-15 | 4-8 |
| Water (wt %) | >95% | >95% |
| Other Additives | Balance | Balance |

TABLE 17

Representative NFC/Viscosity Modifier Bonding Compositions Content Ranges

| Component | Typical | Typical | Select |
|---|---|---|---|
| NFC (wt %) | 0.15%-3% | 0.175%-2% | 0.2%-1.25% |
| Viscosity modifier (wt %) | 0.02%-0.2% | 0.05%-0.15% | 0.07%-0.13% |
| Weight Ratio NFC:Viscosity Modifier | 2.5-10 | 3-9 | 4-8 |

TABLE 17-continued

Representative NFC/Viscosity Modifier Bonding Compositions Content Ranges

| Component | Typical | Typical | Select |
|---|---|---|---|
| Water (wt %) | >95% | >95% | >95% |
| Other Additives | Balance | Balance | Balance |

The NFC/Viscosity Modifier Bonding Compositions of Table 16 include those wherein the ply bonding agent composition contains a surface tension modifier.

In some embodiments, the ply bonding adhesive or composition has a surface tension of less than 60 mN/m; preferably less than 55 mN/m.

Summary of Embodiments

There is thus provided in accordance with the present invention a roll of absorbent sheet tail-sealed with an NFC containing tail-seal adhesive comprising: (a) a roll of absorbent cellulosic sheet; (b) an NFC containing tail-seal adhesive interposed between a tail of the roll of absorbent sheet and an underlying convolution of the roll adhering the tail to the underlying convolution of the roll to form a tail-seal, wherein said NFC containing tail-seal adhesive comprises nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier, optionally including a surface tension modifier other than PVOH. The NFC containing tail-seal adhesive may be configured as a glue line extending across the width of the roll, typically wherein the glue line extends substantially the entire distance across the width of the roll. The tail-seal adhesive may be applied in an amount of from 10 mg to 70 mg per cm of width of the roll of absorbent sheet.

In any embodiment, the tail-seal adhesive may be applied in a plurality of glue lines across the width of the roll and the roll of absorbent sheet may have any or all of the following features: the roll may have a Tail-Seal Bond Strength of from 50 grams to 300 grams; the roll may have a Tail-Seal Bond Strength of from 75 grams to 250 grams; the absorbent sheet of the roll may be multiply absorbent sheet having a basis weight of from 15 to 60 lbs/3000 ft$^2$ wherein the multiply absorbent sheet is prepared from CWP basesheet, or the multiply absorbent sheet is prepared from TAD basesheet, or the multiply absorbent sheet is prepared from structured basesheet.

The roll of absorbent sheet tail-sealed with an NFC containing adhesive may be characterized in any embodiment: wherein the absorbent sheet is treated with debonder; wherein the roll of absorbent sheet comprises a plurality of individual sheets separated by perforations; wherein the tail-seal is a flat tail-seal; or wherein the tail-seal is a folded tail-seal.

The roll of absorbent sheet tail-sealed with an NFC containing tail-seal adhesive may be a roll of tissue sheet composed predominantly of hardwood papermaking fiber, having a Tail-Seal Bond Strength of from 75 grams to 150 grams; or the roll of absorbent sheet tail-sealed with an NFC containing tail-seal adhesive may be a roll of towel sheet composed predominantly of softwood fiber, having a Tail-Seal Bond Strength of from 100 grams to 300 grams.

The NFC containing tail-seal adhesive, in any embodiment, may comprise, in addition to nanofibrillated cellulose, one or more of: (i) a water soluble cellulose derivative such as hydroxy propyl methyl cellulose or hydroxy propyl cellulose; or (ii) a water soluble polyol; and (iii) a viscosity modifier other than a water soluble cellulose derivative. The water soluble polyol may be a polyethylene glycol having a molecular weight of from 400 to 10,000 Daltons. The adhesive may include a water soluble cellulose derivative, or both a water soluble cellulose derivative and a water soluble polyol as well as a viscosity modifier other than a cellulose derivative, such as xanthan gum.

In any embodiment of the invention, the NFC containing composition comprises PVOH and NFC, and/or the NFC containing composition contains NFC and a viscosity modifier such as xanthan gum or carboxymethylcellulose. Optionally, the viscosity modifier is selected from pectin, collagen, furcellaran, gelatin, methylcellulose, ethylcellulose, hydroxyethylcellulose, carboxy ethylcellulose, natural rosins, corn starch, potato starch, arrowroot, ethoxylated linear alcohols, polyethylene glycols, polypropylene glycols, agar, alginic acid, and sodium alginate, carrageenan, gum arabic from the sap of Acacia trees, gum ghatti from the sap of *Anogeissus* trees, gum tragacanth from the sap of *astragalus* shrubs, karaya gum from the sap of *sterculia* trees, guar gum from guar beans, locust bean gum from the seeds of the carob tree, beta-glucan from oat or barley bran, chicle gum, dammar gum from the sap of dipterocarpaceae trees, glucomannan from the konjac plant, mastic gum obtained from the mastic tree, *psyllium* seed husks from the *plantago* plant, spruce gum, tara gum from the seeds of the tara tree; gellan gum and combinations thereof.

The NFC containing tail-seal adhesive may contain a surface tension modifier such as a surface tension modifier selected from surfactants and water soluble polymers such as a nonionic surfactant, or PVOH.

In another aspect of the invention, there is provided a method of tail-sealing a roll of absorbent sheet comprising: (a) providing a roll of absorbent cellulosic sheet; (b) applying an aqueous NFC containing tail-seal adhesive to a tail of the roll of absorbent sheet such that the bonding agent is interposed between the tail and an underlying convolution of the roll; wherein said NFC containing tail-seal adhesive comprises nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier; said tail-seal adhesive optionally including (vi) a surface tension modifier other than PVOH; and (c) adhering the tail to the underlying convolution of the roll to form a tail-seal.

One preferred aspect of the invention is directed to a method of tail-sealing a roll of absorbent sheet with an NFC containing aqueous tail-seal adhesive as described above, wherein the tail-seal adhesive comprises: (a) greater than 90 wt % water; (b) water soluble polyol and a water soluble cellulose derivative present in an aggregate amount of from 1.5 wt % to 7 wt %, wherein the weight ratio of water soluble polyol to water soluble cellulose derivative is from 2 to 10; and (c) nanofibrillated cellulose present in an amount of from 0.025 wt % to 0.5 wt %, wherein the weight ratio of water soluble polyol and water soluble cellulose derivative collectively to NFC is from 5 to 125. The water soluble polyol may be polyethylene glycol having a molecular weight of from 400 to 10,000 Daltons as noted above.

Another preferred aspect of the invention is directed to a method of tail-sealing a roll of absorbent sheet with an NFC containing aqueous tail-seal adhesive as described above, wherein the tail-seal adhesive comprises: (a) greater than 90 wt % water; (b) a viscosity modifier other than a water soluble cellulose derivative present in an amount of from 0.25% to 3 wt %, (c) water soluble polyol and a water soluble cellulose derivative present in an aggregate amount of from 1 wt % to 5 wt %, wherein the weight ratio of the water soluble polyol to the water soluble cellulose derivative is from 2 to 10; and (d) nanofibrillated cellulose present in an amount of from 0.25 wt % to 1 wt %, wherein the weight ratio of water soluble polyol and water soluble cellulose derivative collectively to NFC is from 1 to 25.

Yet another preferred embodiment is directed to a method of tail-sealing a roll of absorbent sheet with an NFC containing aqueous tail-seal adhesive as described herein, wherein the tail-seal adhesive comprises: (a) 95 wt % or more water; (b) NFC present in an amount of from 0.05 wt % to 0.75 wt %; and (c) a viscosity modifier present in an amount of from 0.05 wt % to 2 wt %, wherein the percent weight ratio of NFC:viscosity modifier is from 2.5% to 1000%.

Still yet another preferred embodiment is directed to a method of tail-sealing a roll of absorbent sheet with an NFC containing aqueous tail-seal adhesive as described herein, wherein the tail-seal adhesive comprises: (a) greater than 90 wt % water; (b) water soluble polyol and a water soluble cellulose derivative present in an aggregate amount of 0.5 wt % to 5 wt % wherein the weight ratio of the water soluble polyol to the water soluble cellulose derivative is from 2 to 10; (c) nanofibrillated cellulose in an amount of from 0.025 wt % to 0.2 wt %; and (d) a viscosity modifier other than a water soluble cellulose derivative present in an amount of from 0.3 wt % to 2 wt %, wherein the percent weight ratio of NFC:viscosity modifier other than water soluble cellulose derivative is from 2.5% to 75%.

A still further preferred aspect of the invention is directed to a method of tail-sealing a roll of absorbent sheet with an NFC containing aqueous tail-seal adhesive as described herein, wherein the tail-seal adhesive comprises: (a) greater than 90 wt % water; (b) nanofibrillated cellulose present in an amount of from 0.05 wt % to 0.2 wt %; and (c) a viscosity modifier present in an amount of from 0.3% to 3 wt %, wherein the percent weight ratio of NFC:viscosity modifier is from 2.5% to 75%.

In any embodiment wherein the NFC containing aqueous tail-seal adhesive comprises PVOH and NFC, the weight ratio of PVOH:NFC may be anywhere from 5 to 125, such as from 10 to 75. The NFC containing aqueous tail-seal adhesive may comprise from 2.5 wt % to 6 wt % PVOH, greater than 90 wt % water and from 0.025% to 0.4% NFC wherein the content of PVOH, NFC and water is based on the weight of the aqueous tail-seal adhesive or the aqueous NFC containing aqueous tail-seal adhesive comprise from 1 wt % to 7 wt % PVOH, from 0.04 wt % to 0.2 wt % NFC and greater than 95 wt % water wherein the content of PVOH, NFC and water is based on the weight of the aqueous tail-seal adhesive.

In any embodiment wherein the NFC containing aqueous tail-seal adhesive contains NFC and a viscosity modifier, the weight ratio of NFC:viscosity modifier may be from 5% to 10%, or the weight ratio of NFC:viscosity modifier may be from 200% to 750%.

In any embodiment, the nanofibrillated cellulose employed may have a Characteristic Breaking Length of from 4.5 km to 9 km, such as a Characteristic Breaking Length of from 6.5 km to 7.5 km and/or a Characteristic Nanofiber Viscosity of greater than 15,000 cP at a shear rate of 5 sec$^{-1}$ and a Characteristic Nanofiber Viscosity of less than 2,000 cP at a shear rate of 500 sec$^{-1}$, optionally exhibiting a Characteristic Nanofiber Viscosity reduction of at least 60% as the shear rate is increased from 5 sec$^{-1}$ to 500 sec$^{-1}$. The nanofibrillated cellulose may exhibit a Characteristic Nanofiber Viscosity reduction of at least 70% as the shear rate is increased from 5 sec$^{-1}$ to 500 sec$^{-1}$; or a Characteristic Nanofiber Viscosity reduction of at least 80% as the shear rate is increased from 5 sec$^{-1}$ to 500 sec$^{-1}$; or a Characteristic Nanofiber Viscosity reduction of at least 90% as the shear rate is increased from 5 sec$^{-1}$ to 500 sec$^{-1}$.

In any embodiment, the NFC containing aqueous tail-seal adhesive may include an anti-microbial additive selected from potassium sorbate; sorbic acid; sodium sorbate; calcium sorbate; benzoic acid; calcium benzoate; potassium benzoate; sodium benzoate; calcium hydrogen sulphite; calcium sulphite; potassium bisulphite; potassium metabisulphite; potassium sulphite; sodium bisulphite; sodium metabisulphite; sodium sulphite; Sulphur dioxide; potassium nitrate; potassium nitrite; sodium nitrate; sodium nitrite; calcium propionate; potassium propionate; propionic acid; sodium propionate; and mixtures thereof; and/or the NFC containing tail-seal adhesive further comprises a tackifier; a crosslinker; an insolubilizer; a filler; a second viscosity modifier; a water-resistance additive; a flame retardant; a lubricant; a softening agent; a pigment; a dye; an antioxidant; a UV-stabilizer; a resin; a rosin; a wax; a flowing agent; a compatibilizer; an aroma; or combinations thereof.

One preferred aqueous NFC containing tail-seal adhesive comprises: (a) water; (b) nanofibrillated cellulose; (c) one or more of: (i) a water-soluble cellulose derivative; or (ii) a water soluble polyol; and (iii) a viscosity modifier other than a water soluble cellulose derivative. The aqueous NFC containing tail-seal adhesive may include: (a) greater than 90 wt % water; (b) water soluble polyol and a water soluble cellulose derivative present in an aggregate amount of from 1.5 wt % to 7 wt %, wherein the weight ratio of water soluble polyol to water soluble cellulose derivative is from 2 to 10; and (c) nanofibrillated cellulose present in an amount of from 0.025 wt % to 0.5 wt %, wherein the weight ratio of water soluble polyol and water soluble cellulose derivative collectively to NFC is from 5 to 125. The aqueous NFC containing tail-seal adhesive may alternatively include: (a) greater than 90 wt % water; (b) a viscosity modifier other than a water soluble cellulose derivative present in an amount of from 0.25% to 3 wt %, (c) water soluble polyol and a water soluble cellulose derivative present in an aggregate amount of from 1 wt % to 5 wt %, wherein the weight ratio of the water soluble polyol to the water soluble cellulose derivative is from 2 to 10; and (d) nanofibrillated cellulose present in an amount of from 0.25 wt % to 1 wt %, wherein the weight ratio of water soluble polyol and water soluble cellulose derivative collectively to NFC is from 1 to 25; or may be characterized by including: (a) 95 wt % or more water; (b) NFC present in an amount of from 0.05 wt % to 0.75 wt %; and (c) a viscosity modifier present in an amount of from 0.05 wt % to 2 wt %, wherein the percent weight ratio of NFC:viscosity modifier is from 2.5% to 1000%.

Another preferred aqueous NFC containing tail-seal adhesive comprises: (a) greater than 90 wt % water; (b) water soluble polyol and a water soluble cellulose derivative present in an aggregate amount of 0.5 wt % to 5 wt % wherein the weight ratio of the water soluble polyol to the water soluble cellulose derivative is from 2 to 10; (c)

nanofibrillated cellulose in an amount of from 0.025 wt % to 0.2 wt %; and (d) a viscosity modifier other than a water soluble cellulose derivative present in an amount of from 0.3 wt % to 2 wt %, wherein the percent weight ratio of NFC:viscosity modifier other than water soluble cellulose derivative is from 2.5% to 75%.

In any embodiment, the aqueous NFC containing tail-seal adhesive may comprise: (a) greater than 90 wt % water; (b) nanofibrillated cellulose present in an amount of from 0.05 wt % to 0.2 wt %; and (c) a viscosity modifier present in an amount of from 0.3% to 3 wt %, wherein the percent weight ratio of NFC:viscosity modifier is from 2.5% to 75%.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A roll of absorbent sheet tail-sealed with a nanofibrillated cellulose ("NFC")-containing tail-seal adhesive comprising:
    (a) a roll of absorbent cellulosic sheet; and
    (b) the NFC-containing tail-seal adhesive being interposed between a tail of the roll of absorbent cellulosic sheet and an underlying convolution of the roll adhering the tail to the underlying convolution of the roll to form a tail-seal,
wherein said NFC-containing tail-seal adhesive comprises NFC and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative effective to reduce the viscosity of an aqueous composition including NFC; (iv) is PVOH; and (v) is PVOH and a viscosity modifier, said viscosity modifier being effective to reduce the viscosity of an aqueous composition including NFC,
said tail-seal adhesive optionally including a surface tension modifier other than PVOH.

2. The roll of absorbent sheet tail-sealed with the NFC-containing tail-seal adhesive according to claim 1, wherein the tail-seal adhesive is applied in an amount of from 10 mg to 70 mg per cm along the width of the roll of absorbent sheet.

3. The roll of absorbent sheet tail-sealed with the NFC-containing tail-seal adhesive according to claim 1, wherein the tail-seal adhesive is applied in a plurality of glue lines across the width of the roll.

4. The roll of absorbent sheet tail-sealed with the NFC-containing tail-seal adhesive according to claim 1, wherein the roll has a Tail-Seal Bond Strength of from 50 grams to 300 grams.

5. The roll of absorbent cellulosic sheet tail-sealed with the NFC-containing tail-seal adhesive according to claim 1, wherein the absorbent sheet is multi-ply absorbent cellulosic sheet having a basis weight of from 15 to 60 lbs/3000 ft$^2$.

6. The roll of absorbent cellulosic sheet tail-sealed with the NFC-containing tail-seal adhesive according to claim 1, wherein the roll of absorbent sheet comprises a plurality of individual sheets separated by perforations.

7. The roll of absorbent sheet tail-sealed with the NFC-containing tail-seal adhesive according to claim 1, wherein the tail-seal is a flat tail-seal.

8. The roll of absorbent sheet tail-sealed with the NFC-containing tail-seal adhesive according to claim 1, wherein the tail-seal is a folded tail-seal.

9. The roll of absorbent cellulosic sheet tail-sealed with the NFC-containing tail-seal adhesive according to claim 1, wherein the roll of absorbent cellulosic sheet is a roll of tissue sheet composed predominantly of hardwood papermaking fiber and wherein the tissue roll has a Tail-Seal Bond Strength of from 75 grams to 150 grams.

10. The roll of absorbent sheet tail-sealed with the NFC-containing tail-seal adhesive according to claim 1, wherein the roll of absorbent sheet is a roll of towel sheet composed predominantly of softwood fiber and wherein the towel roll has a Tail-Seal Bond Strength of from 100 grams to 300 grams.

11. A method of making the roll of absorbent sheet tail-sealed with the NFC-containing tail-seal adhesive according to claim 1, comprising:
    (I) providing the roll of absorbent cellulosic sheet;
    (II) applying the NFC-containing tail-seal adhesive to the tail of the roll of absorbent cellulosic sheet such that the tail-seal adhesive is interposed between the tail and the underlying convolution of the roll;
wherein the NFC-containing tail-seal adhesive comprises:
    (a) water;
    (b) the NFC; and
    one or more of (c), (d), or (e):
    (c) the water-soluble cellulose derivative;
    (d) the water soluble polyol;
    (e) the viscosity modifier other than a water soluble cellulose derivative effective to reduce the viscosity of an aqueous composition including NFC.

12. The method of making the roll of absorbent sheet tail-sealed with an NFC-containing tail-seal adhesive according to claim 11, wherein the NFC-containing tail-seal adhesive includes polyethylene glycol as the water soluble polyol.

13. The method of making the roll of absorbent sheet tail-sealed with an NFC-containing tail-seal adhesive according to claim 11, wherein the NFC-containing tail-seal adhesive includes the water soluble cellulose derivative which is selected from hydroxypropyl methyl cellulose and hydroxypropyl cellulose.

14. The method of making the roll of absorbent sheet tail-sealed with an NFC-containing tail-seal adhesive according to claim 11, wherein the NFC-containing tail-seal adhesive comprises the viscosity modifier other than a water soluble cellulose derivative effective to reduce the viscosity of an aqueous composition including NFC.

15. The method of making the roll of absorbent sheet tail-sealed with an NFC-containing tail-seal adhesive according to claim 14, wherein the viscosity modifier is xanthan gum.

16. The method of making the roll of absorbent sheet tail-sealed with an NFC-containing tail-seal adhesive according to claim 11, wherein the NFC-containing tail-seal adhesive comprises:
    (a) greater than 90 wt % water;
    (b) the water soluble polyol and the water soluble cellulose derivative which are present in an aggregate amount of from 1.5 wt % to 7 wt %, wherein a weight ratio of the water soluble polyol to the water soluble cellulose derivative is from 2 to 10; and (c) the NFC which is present in an amount of from 0.025 wt % to 0.5 wt %, wherein a weight ratio of the water soluble polyol and the water soluble cellulose derivative collectively to the NFC is from 5 to 125.

17. The method of making the roll of absorbent sheet tail-sealed with an NFC-containing tail-seal adhesive according to claim 11, wherein the NFC-containing tail-seal adhesive comprises:

(a) greater than 90 wt % water;

(b) the viscosity modifier other than the water soluble cellulose derivative which is present in an amount of from 0.25% to 3 wt %, (c) the water soluble polyol and the water soluble cellulose derivative which are present in an aggregate amount of from 1 wt % to 5 wt %, wherein a weight ratio of the water soluble polyol to the water soluble cellulose derivative is from 2 to 10; and (d) the NFC which is present in an amount of from 0.25 wt % to 1 wt %, wherein a weight ratio of the water soluble polyol and the water soluble cellulose derivative collectively to the NFC is from 1 to 25.

18. The method of making the roll of absorbent sheet tail-sealed with an NFC-containing tail-seal adhesive according to claim 11, wherein the NFC-containing tail-seal adhesive comprises:

(a) 95 wt % or more water;

(b) the NFC which is present in an amount of from 0.05 wt % to 0.75 wt %; and (c) the viscosity modifier other than the water soluble cellulose derivative which is present in an amount of from 0.05 wt % to 2 wt %, wherein a percent weight ratio of the NFC:the viscosity modifier other than the water soluble cellulose derivative is from 2.5% to 1000%.

19. The method of making the roll of absorbent sheet tail-sealed with an NFC-containing tail-seal adhesive according to claim 11, wherein the NFC-containing tail-seal adhesive comprises:

(a) greater than 90 wt % water;

(b) the water soluble polyol and the water soluble cellulose derivative which are present in an aggregate amount of 0.5 wt % to 5 wt % wherein a weight ratio of the water soluble polyol to the water soluble cellulose derivative is from 2 to 10;

(c) the NFC in an amount of from 0.025 wt % to 0.2 wt %; and (d) the viscosity modifier other than the water soluble cellulose derivative which is present in an amount of from 0.3 wt % to 2 wt %, wherein a percent weight ratio of the NFC:the viscosity modifier other than the water soluble cellulose derivative is from 2.5% to 75%.

20. The method of making the roll of absorbent sheet tail-sealed with an NFC-containing tail-seal adhesive according to claim 11, wherein the NFC-containing tail-seal adhesive comprises:

(a) greater than 90 wt % water;

(b) the NFC which is present in an amount of from 0.05 wt % to 0.2 wt %; and (c) the viscosity modifier other than a water soluble cellulose derivative effective to reduce the viscosity of an aqueous composition including NFC which is present in an amount of from 0.3% to 3 wt %, wherein a percent weight ratio of the NFC:the viscosity modifier other than a water soluble cellulose derivative effective to reduce the viscosity of an aqueous composition including NFC is from 2.5% to 75%.

21. A method of tail-sealing a roll of absorbent sheet with a nanofibrillated cellulose ("NFC")-containing tail-seal adhesive comprising:

(a) providing a roll of absorbent cellulosic sheet;

(b) applying an aqueous NFC-containing tail-seal adhesive to a tail of the roll of absorbent cellulosic sheet such that the tail: seal adhesive is interposed between the tail and an underlying convolution of the roll;

wherein said aqueous NFC-containing tail-seal adhesive comprises NFC and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative effective to reduce the viscosity of an aqueous composition including NFC; (iv) is PVOH; and (v) is PVOH and a viscosity modifier, said viscosity modifier being effective to reduce the viscosity of an aqueous composition including NFC; said tail-seal adhesive optionally including (vi) a surface tension modifier other than PVOH; and (c) adhering the tail to the underlying convolution of the roll to form a tail-seal.

22. The method of tail-sealing a roll of absorbent sheet according to claim 21, wherein the aqueous NFC-containing tail-seal adhesive includes greater than 90 wt % water.

23. The method of tail-sealing a roll of absorbent sheet according to claim 21, wherein said aqueous NFC-containing tail-seal adhesive comprises the PVOH and the NFC.

24. The method of tail-sealing a roll of absorbent sheet according to claim 21, wherein said aqueous NFC-containing tail-seal adhesive contains the NFC and at least one of xanthan gum, carboxymethylcellulose (CMC) or pectin.

25. The method of tail-sealing a roll of absorbent sheet according to claim 21, wherein said aqueous NFC-containing tail-seal adhesive contains xanthan gum.

* * * * *